(12) United States Patent
Boyd et al.

(10) Patent No.: US 7,657,662 B2
(45) Date of Patent: Feb. 2, 2010

(54) PROCESSING USER SPACE OPERATIONS DIRECTLY BETWEEN AN APPLICATION INSTANCE AND AN I/O ADAPTER

(75) Inventors: William Todd Boyd, Poughkeepsie, NY (US); John Lewis Hufferd, San Jose, CA (US); Agustin Mena, III, Austin, TX (US); Renato J. Recio, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 11/216,712

(22) Filed: Aug. 31, 2005

(65) Prior Publication Data

US 2007/0078892 A1 Apr. 5, 2007

(51) Int. Cl.
G06F 3/00 (2006.01)
G06F 12/00 (2006.01)
(52) U.S. Cl. .......................................... 710/5; 711/163
(58) Field of Classification Search ................... 710/62; 711/147
See application file for complete search history.

(56) References Cited

U.S. PATENT DOCUMENTS

| | | | |
|---|---|---|---|
| 4,796,178 A | 1/1989 | Jennings et al. | |
| 5,313,592 A | 5/1994 | Buondonno et al. | |
| 5,369,749 A | 11/1994 | Baker et al. | |
| 5,377,337 A | 12/1994 | Antognini et al. | |
| 5,414,851 A | 5/1995 | Brice, Jr. et al. | |
| 5,535,416 A | 7/1996 | Feeney et al. | |
| 5,659,798 A | 8/1997 | Blumrich et al. | |
| 5,732,269 A | 3/1998 | Compton et al. | |
| 5,893,919 A | 4/1999 | Sarkozy et al. | |
| 5,926,833 A | 7/1999 | Rasoulian et al. | |
| 5,968,143 A | 10/1999 | Chisholm et al. | |
| 5,983,301 A * | 11/1999 | Baker et al. | ................... 710/113 |
| 5,991,753 A | 11/1999 | Wilde | |
| 6,003,123 A | 12/1999 | Carter et al. | |
| 6,009,476 A | 12/1999 | Flory et al. | |
| 6,047,307 A | 4/2000 | Radko | |

(Continued)

FOREIGN PATENT DOCUMENTS

JP 10289158 A 10/1998

OTHER PUBLICATIONS

U.S. Appl. No. 11/216,736, filed Aug. 31, 2005, Boyd et al.

(Continued)

Primary Examiner—Henry W. H. Tsai
Assistant Examiner—Titus Wong
(74) Attorney, Agent, or Firm—Francis Lammes; Stephen J. Walder, Jr.; Randall J. Bluestone

(57) ABSTRACT

A mechanism is provided that enables user space middleware or applications to pass file name based storage requests directly to a physical I/O Adapter without run-time involvement from the local Operating System (OS). A mechanism is provided for using a file protection table (FPT) data structure, which may include a file name protection table (FNPT) and file extension protection table (FEPT), to control user space and out of user space Input/Output (I/O) operations. In addition, a mechanism is provided for managing the FPT based on user space operations to create, query, modify and delete entries in the FPT.

17 Claims, 10 Drawing Sheets

U.S. PATENT DOCUMENTS

| | | | |
|---|---|---|---|
| 6,061,794 A | 5/2000 | Angelo et al. | |
| 6,091,727 A * | 7/2000 | Han et al. | 370/395.21 |
| 6,092,168 A | 7/2000 | Voigt | |
| 6,115,772 A | 9/2000 | Crater | |
| 6,145,030 A | 11/2000 | Martwick | |
| 6,192,408 B1 | 2/2001 | Vahalia et al. | |
| 6,247,024 B1 | 6/2001 | Kincaid | |
| 6,345,301 B1 | 2/2002 | Burns et al. | |
| 6,345,347 B1 | 2/2002 | Biran | |
| 6,360,282 B1 | 3/2002 | Langerman et al. | |
| 6,446,209 B2 | 9/2002 | Kern et al. | |
| 6,493,825 B1 | 12/2002 | Blumenau et al. | |
| 6,535,518 B1 | 3/2003 | Hu et al. | |
| 6,550,061 B1 | 4/2003 | Bearden et al. | |
| 6,553,412 B1 | 4/2003 | Kloba et al. | |
| 6,578,122 B2 | 6/2003 | Beukema et al. | |
| 6,594,787 B1 | 7/2003 | Chesson | |
| 6,654,818 B1 | 11/2003 | Thurber | |
| 6,665,747 B1 | 12/2003 | Nazari | |
| 6,704,831 B1 | 3/2004 | Avery | |
| 6,718,372 B1 | 4/2004 | Bober | |
| 6,721,847 B2 | 4/2004 | Hursey | |
| 6,725,296 B2 * | 4/2004 | Craddock et al. | 710/52 |
| 6,751,680 B2 | 6/2004 | Langerman et al. | |
| 6,753,873 B2 | 6/2004 | Dixon et al. | |
| 6,789,143 B2 | 9/2004 | Craddock et al. | |
| 6,816,891 B1 | 11/2004 | Vahalia et al. | |
| 6,834,332 B2 | 12/2004 | Craddock et al. | |
| 6,842,784 B1 | 1/2005 | Black | |
| 6,845,403 B2 | 1/2005 | Chadalapaka | |
| 6,996,638 B2 | 2/2006 | Brice, Jr. et al. | |
| 7,124,207 B1 | 10/2006 | Lee et al. | |
| 7,272,676 B2 | 9/2007 | Saito et al. | |
| 7,272,832 B2 | 9/2007 | Gardner | |
| 2002/0004890 A1 | 1/2002 | Ofek et al. | |
| 2002/0059309 A1 | 5/2002 | Loy et al. | |
| 2002/0071567 A1 | 6/2002 | Kurn et al. | |
| 2002/0078239 A1 | 6/2002 | Howard et al. | |
| 2002/0083224 A1 * | 6/2002 | Langerman et al. | 710/3 |
| 2002/0091841 A1 | 7/2002 | Beukema | |
| 2002/0099879 A1 | 7/2002 | Bayer et al. | |
| 2002/0104008 A1 | 8/2002 | Cochran et al. | |
| 2002/0124013 A1 | 9/2002 | Loy et al. | |
| 2002/0124148 A1 | 9/2002 | Beukema et al. | |
| 2002/0147916 A1 | 10/2002 | Strongin et al. | |
| 2002/0169938 A1 | 11/2002 | Scott et al. | |
| 2002/0194408 A1 | 12/2002 | Capps, Jr. et al. | |
| 2003/0009484 A1 * | 1/2003 | Hamanaka et al. | 707/200 |
| 2003/0018877 A1 | 1/2003 | Gaskins et al. | |
| 2003/0023791 A1 | 1/2003 | Suzuki et al. | |
| 2003/0078944 A1 | 4/2003 | Yamauchi et al. | |
| 2003/0093625 A1 * | 5/2003 | Beukema et al. | 711/147 |
| 2003/0105936 A1 | 6/2003 | Stakutis et al. | |
| 2003/0110205 A1 | 6/2003 | Johnson | |
| 2003/0110445 A1 | 6/2003 | Khaleque | |
| 2003/0115221 A1 * | 6/2003 | Goode et al. | 707/200 |
| 2003/0182422 A1 | 9/2003 | Bradshaw et al. | |
| 2003/0200298 A1 | 10/2003 | Su et al. | |
| 2003/0229690 A1 | 12/2003 | Kitani et al. | |
| 2003/0233564 A1 * | 12/2003 | LaRose et al. | 713/193 |
| 2004/0003137 A1 | 1/2004 | Callender et al. | |
| 2004/0010701 A1 * | 1/2004 | Umebayashi et al. | 713/193 |
| 2004/0049580 A1 | 3/2004 | Boyd et al. | |
| 2004/0049603 A1 | 3/2004 | Boyd et al. | |
| 2004/0054866 A1 | 3/2004 | Blumenau et al. | |
| 2004/0078521 A1 | 4/2004 | Hawks et al. | |
| 2004/0083308 A1 | 4/2004 | Sebastian et al. | |
| 2004/0165607 A1 | 8/2004 | Carnevale et al. | |
| 2004/0193825 A1 | 9/2004 | Garcia et al. | |
| 2004/0210598 A1 | 10/2004 | Sturms | |
| 2005/0021848 A1 | 1/2005 | Jorgenson | |
| 2005/0044375 A1 | 2/2005 | Paatero et al. | |
| 2005/0066076 A1 | 3/2005 | Best et al. | |
| 2005/0091029 A1 | 4/2005 | Traut | |
| 2005/0091383 A1 | 4/2005 | Bender et al. | |
| 2005/0138230 A1 | 6/2005 | Raisch | |
| 2005/0172040 A1 | 8/2005 | Hashimoto | |
| 2005/0246453 A1 * | 11/2005 | Erlingsson et al. | 710/1 |
| 2005/0289193 A1 | 12/2005 | Arrouye et al. | |
| 2006/0168365 A1 | 7/2006 | Martinez et al. | |
| 2006/0212608 A1 | 9/2006 | Arndt et al. | |
| 2006/0212620 A1 | 9/2006 | Arndt et al. | |
| 2007/0130356 A1 | 6/2007 | Boucher et al. | |

OTHER PUBLICATIONS

U.S. Appl. No. 11/216,832, filed Aug. 31, 2005, Boyd et al.
U.S. Appl. No. 11/216,879, filed Aug. 31, 2005, Boyd et al.
Debergalis et al., "The Direct Access File System", Proceedings of the 2nd USENIX Conference on File and Storage Technologies (FAST '03), Mar. 31-Apr. 2, 2003, pp. 175-188.
Boyd et al., "System and Method for Processor Queue to Linear Block Address Translation Using Protection Table Control Based on a Protection Domain", U.S. Appl. No. 11/135,266, filed May 23, 2005.
Boyd et al., "System and Method for Processing Block Mode I/O Operations Using a Linear Block Address Translation Protection Table", U.S. Appl. No. 11/135,257, filed May 23, 2005.
Boyd et al., "System and Method for Out of User Space Block Mode I/O Directly Between an Application Instance and an I/O Adapter", U.S. Appl. No. 11/135,541, filed May 23, 2005.
Boyd et al., "System and Method for Creation/Deletion of Linear Block Address Table Entries for Direct I/O", U.S. Appl. No. 11/135,539, filed May 23, 2005.
Boyd et al., "System and Method for User Space Operations for Direct I/O Between an Application Instance and an I/O Adapter", U.S. Appl. No. 11/135,542, filed May 23, 2005.
Boyd et al., "System and Method for Query/Modification of Linear Block Address Table Entries for Direct I/O", U.S. Appl. No. 11/135,540, filed May 23, 2005.
Boyd et al., "System and Method for Out of User Space I/O Directly Between a Host System and a Physical Adapter Using File Based Linear Block Address Translation", Serial No. Not Known, Filed Herewith.
Boyd et al., "System and Method for File Based I/O Directly Between an Application Instance and an I/O Adapter", Serial No. Not Known, Filed Herewith.
Boyd et al., "System and Method for Out of User Space I/O with Server Authentication", Serial No. Not Known, Filed Herewith.
Arndt et al., Data Processing System, Method, and Computer Program Product for Creation and Initialization of a Virtual Adapter on a Physical Adapter that Supports Virtual Adapter Level Virtualization, U.S. Appl. No. 11/065,829, filed Feb. 25, 2005.
"Prevent Unauthorized Access to Data in Database Servers by the Transaction Manager", IBM Technical Disclosure No. NA9402629, vol. 37, Issue No. 2A, Feb. 1, 2994, 4 pages.
"Asynchronous Queued I/O Processor Architecture", IBM Technical Disclosure No. NN9301265, vol. 36, Issue No. 1, Jan. 1, 1993, 12 pages.
Fiuczynski et al., "SPINE: A Safe Programm", Proceedings of the 8th ACM SIGOPS European workshop on Support for composing distributed applications. Sep. 1998, 9 pages.
CICS System Definition Guide, Release 3, IBM, SC33-1682-02, Third Edition, Mar. 1999, pp. 104 and 199.

* cited by examiner

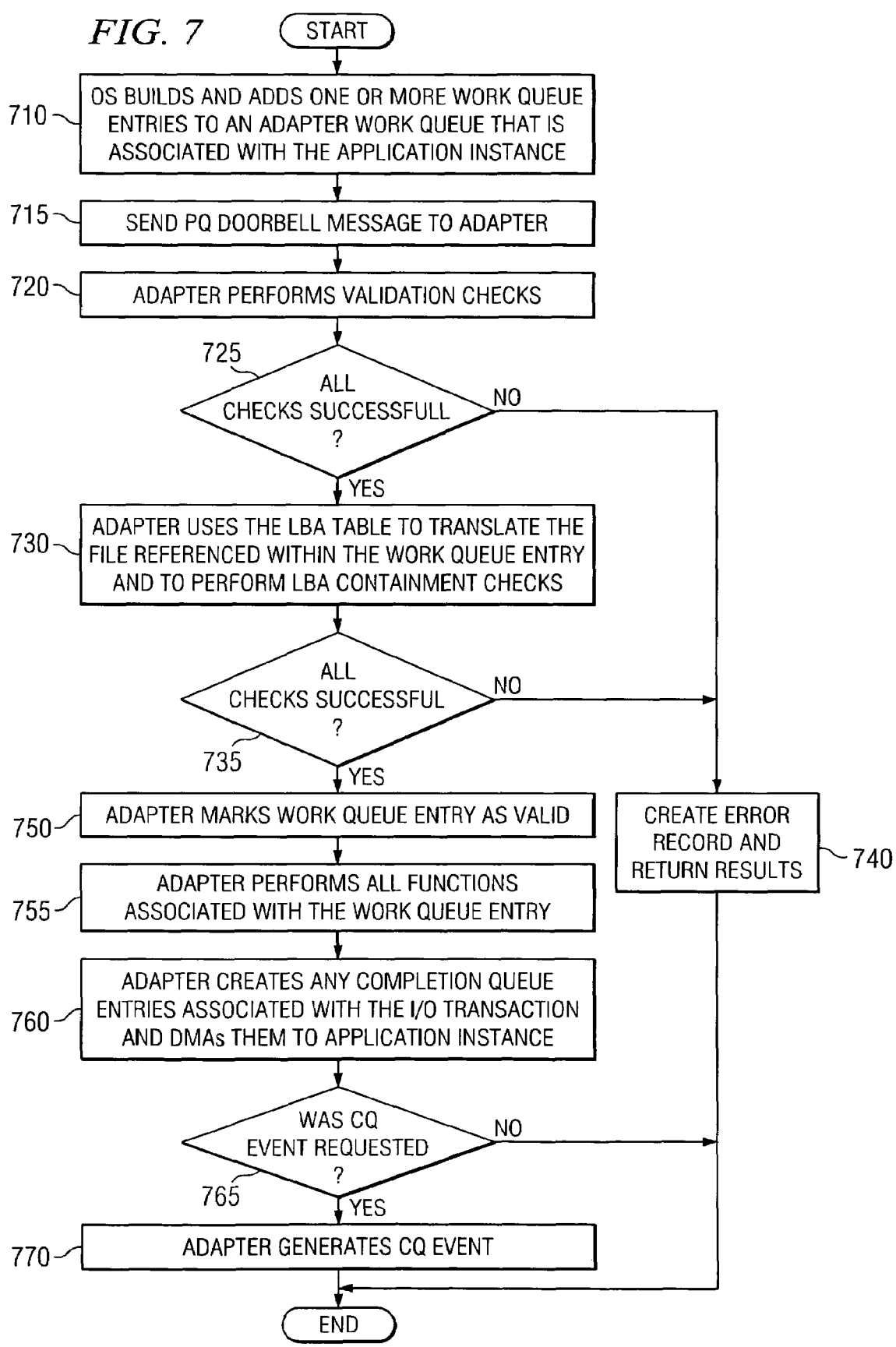

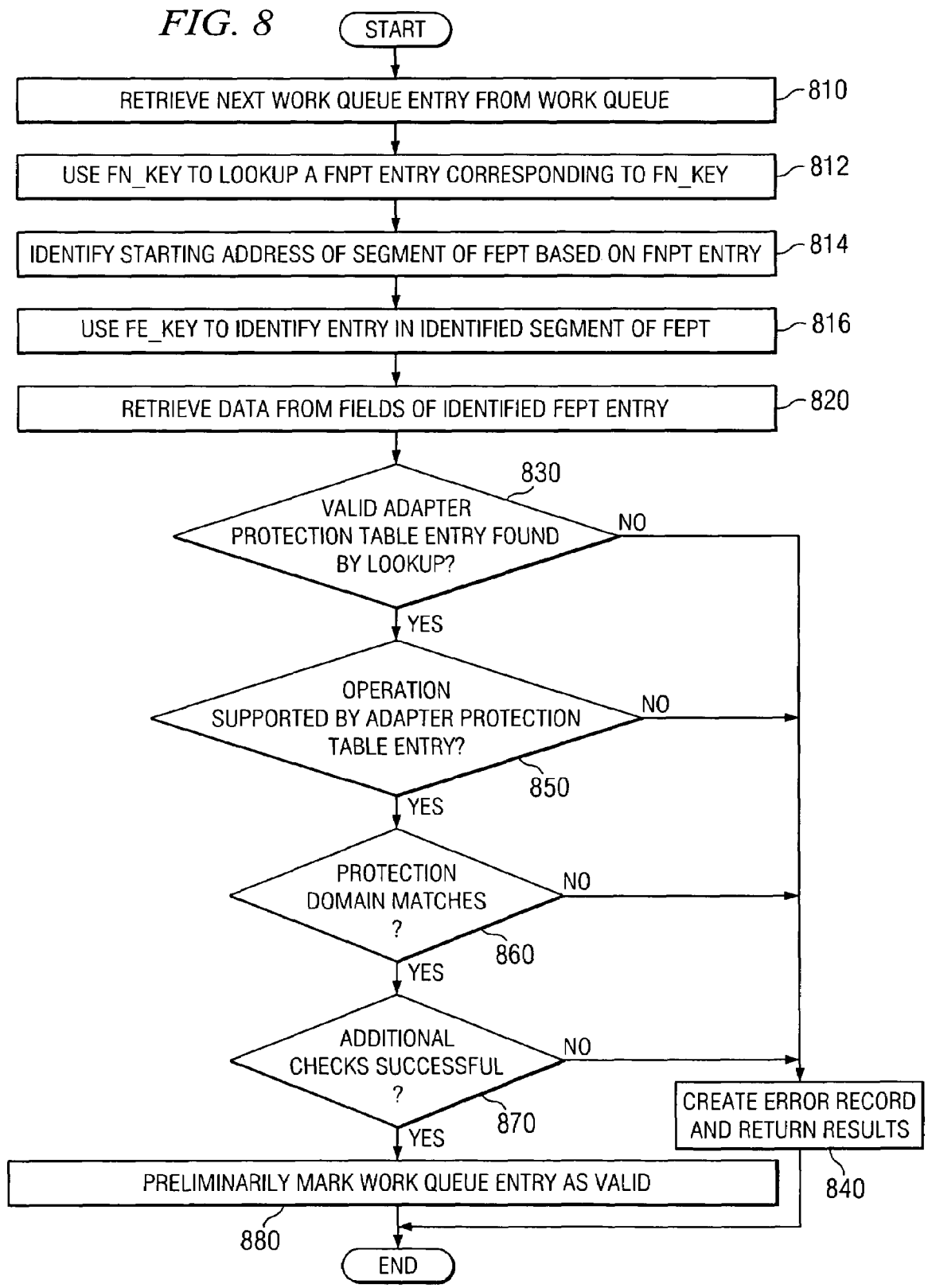

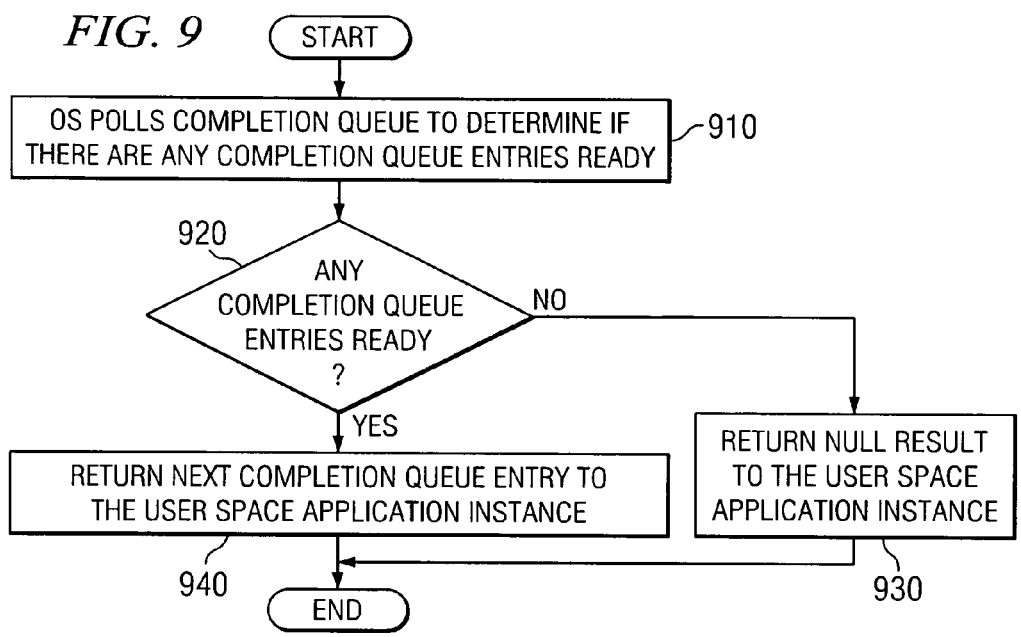
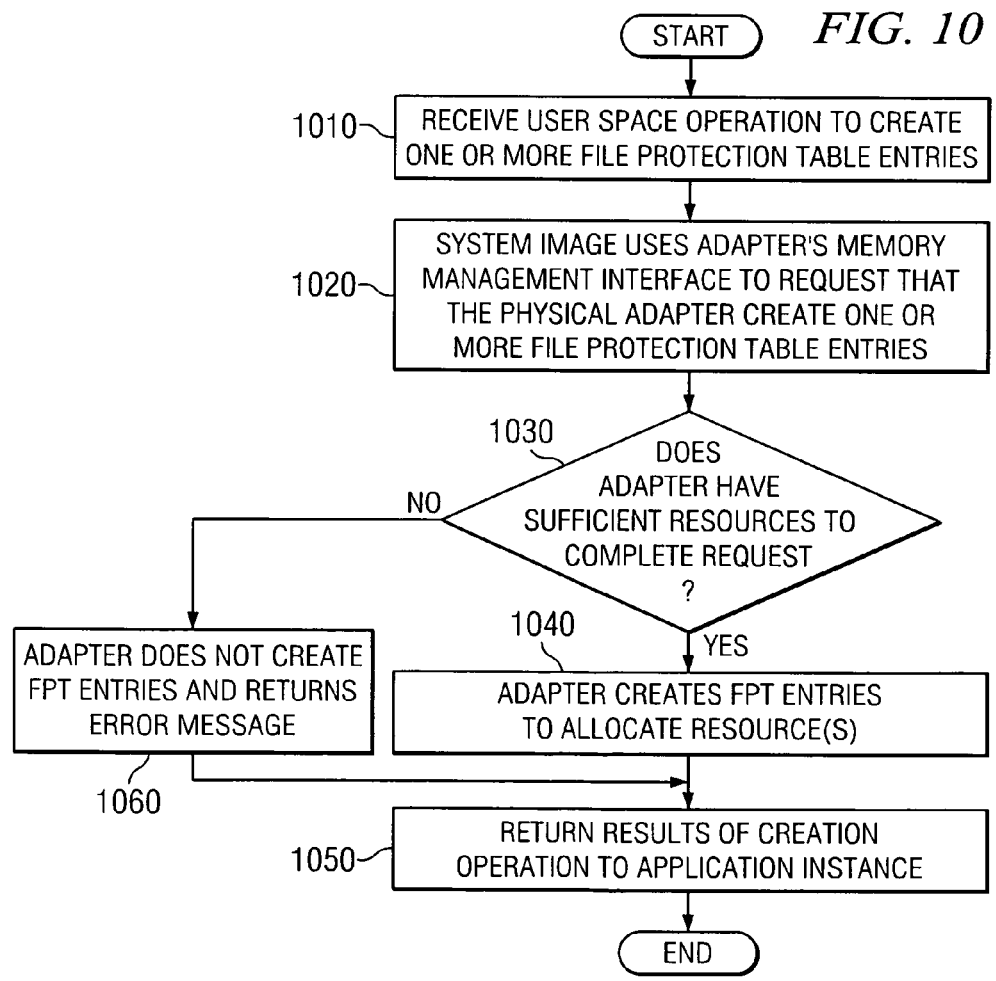

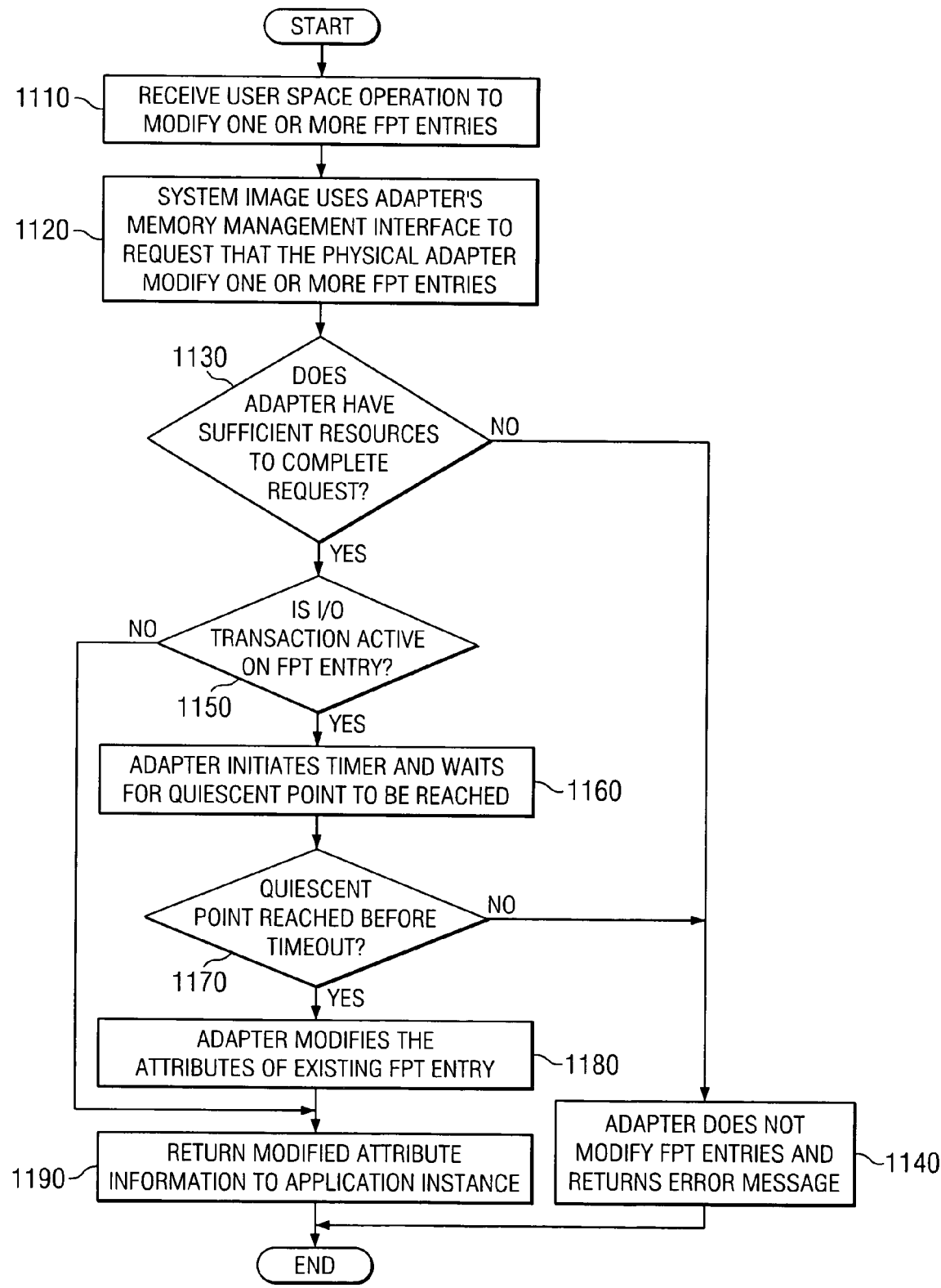

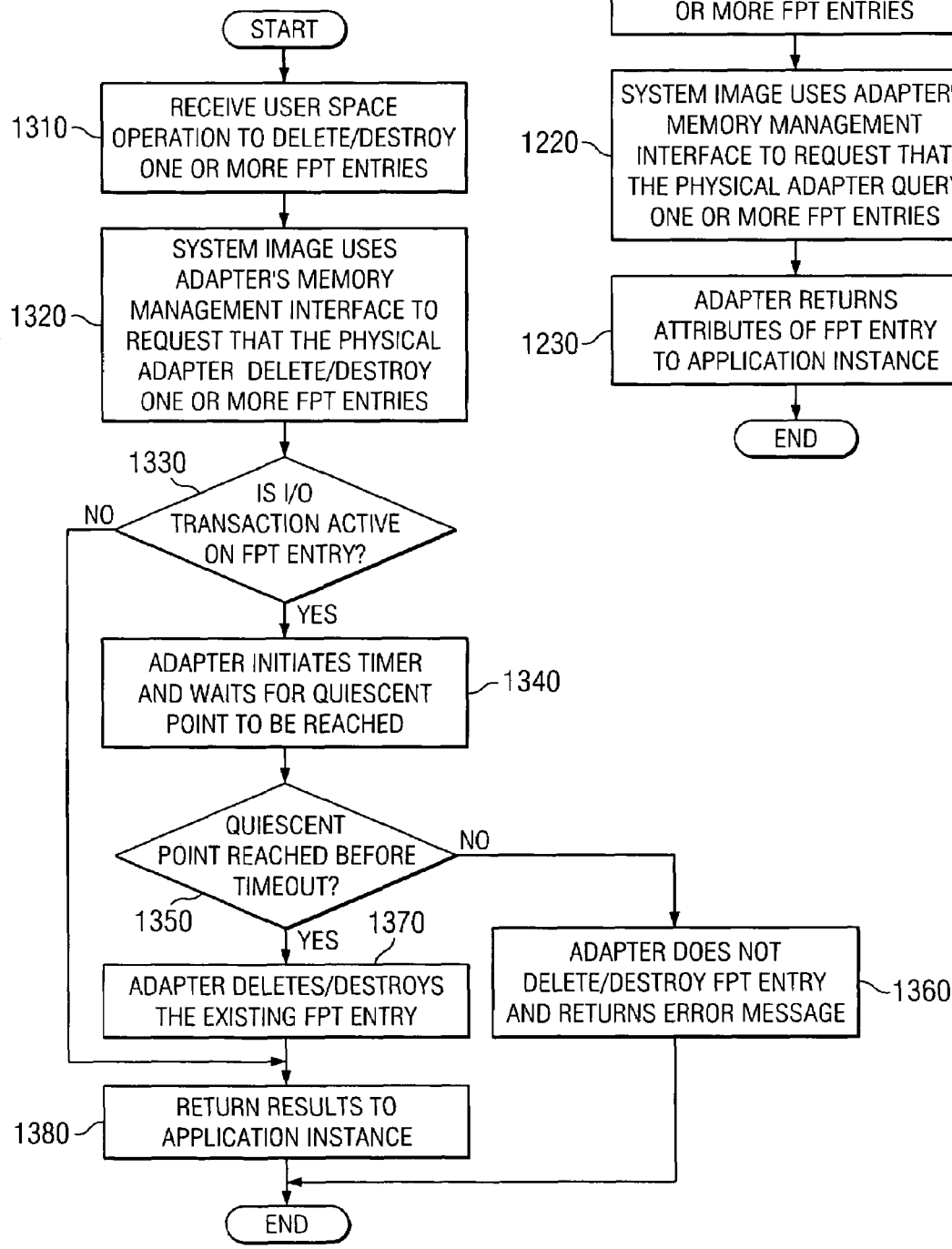

PROCESSING USER SPACE OPERATIONS DIRECTLY BETWEEN AN APPLICATION INSTANCE AND AN I/O ADAPTER

BACKGROUND OF THE INVENTION

1. Technical Field

The present invention relates generally to communication protocols between a host computer and an input/output (I/O) adapter. More specifically, the present invention is directed to a system and method for processing user space operations directly between an application instance and an I/O adapter without run-time involvement from the local Operating System (OS), or, in a virtual system, the local hypervisor.

2. Description of Related Art

Operating systems, according to the present state of the art, do not permit user space middleware or applications, such as a database, to directly access persistent storage that is identified through the File Mode I/O Interface of the Operating System's Local File System. As a result, the user space middleware must invoke an Operating System (OS) call and incur several task switches every time an I/O operation is performed. The first task switch is caused when the middleware or application transfers a storage request to the OS. A second task switch occurs when the OS passes control back to the user space middleware or application, after the OS completes processing the middleware or application storage request and passes the storage request to the storage adapter.

A third task switch occurs when the storage adapter completes the associated I/O storage operations and interrupts the processing being performed by an application so that the OS may process the storage adapter's completion. The final task switch occurs when the OS finishes processing the storage adapter's completion and gives control back to the middleware or application that transferred the storage request to the OS. In addition to these task switches the storage adapter typically has a single request queue to process work from the operating system.

The four task switches described above may be considered wasted processor cycles, because all work on the thread being switched is stopped until the task switch is complete. On some servers, the number of storage operations performed by a user space middleware or application program may be quite large. Modern, high-end servers may have millions of these operations per second, resulting in several million task switches per second.

SUMMARY OF THE INVENTION

In one illustrative embodiment a mechanism is provided for handling input/output (I/O) storage requests in which such task switches are minimized. The illustrative embodiment receives a user space operation from a user management interface. The illustrative embodiment determines if the user space operation is a resource management operation or a processing queue operation. If the user space operation is the resource management operation, the illustrative embodiment performs at least one resource management operation to manage a resource allocation for a resource in a file protection table data structure having a file name protection table, a file extension protection table, and a storage block address table. In the illustrative embodiment, the storage block address table identifies portions of a storage device which is to be allocated to a set of files for which the resource allocation is requested. In the illustrative embodiment, the file extension protection table comprises a set of pointers to one or more entries in the storage block address table and a set of file extension keys. In performing the at least one resource management operation, the illustrative embodiment determine if the user space operation is a resource modify operation. The illustrative embodiment then modify at least one attribute associated with a resource allocation in a file protection table entry in response to the user space operation being the resource modify operation. In the illustrative embodiment modifying the at least one attribute associated with the resource allocation in the file protection table entry comprises modifying an attribute in a storage block address table entry. The illustrative embodiment then initiates a timer if there is an I/O transaction active on the file protection table entry, determines if a quiescent point at which there are no I/O transactions active on the file protection table entry being modified is reached before the timer times out; and modifies the file protection table entry only if the quiescent point is reached before the timer times out. In the illustrative embodiment, the file name protection table comprises a set of pointers to one or more segments of the file extension protection table and a set of file name keys. If the user space operation is the processing queue operation, the illustrative embodiment performs at least one processing queue operation, directly with an input/output (I/O) adapter without intervention by a system image, to manage a processing queue. In performing the at least one processing queue operation, the illustrative embodiment retrieves a completion queue entry from a completion queue in an I/O adapter for a completed out of user space input/output operation.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart outlining an exemplary operation of one exemplary embodiment of the present invention when an invoked user space operation is a work queue operation requiring generating and processing or work queue elements;

FIG. 8 is a flowchart outlining an exemplary operation of one exemplary embodiment of the present invention when performing validation checks to determine if a work queue entry is valid and may be processed by the physical I/O adapter;

FIG. 9 is a flowchart outlining an exemplary operation of one exemplary embodiment of the present invention when the invoked user space operation is a completion queue retrieval process operation;

FIG. 10 is a flowchart outlining an exemplary operation of one exemplary embodiment of the present invention when creating a file protection table entry in accordance with an exemplary embodiment of the present invention;

FIG. 11 is a flowchart outlining an exemplary operation of one exemplary embodiment of the present invention when processing a user space operation that is a resource modify operation;

FIG. 12 is a flowchart outlining an exemplary operation of one exemplary embodiment of the present invention when processing a query user space operation; and FIG. 13 is a flowchart outlining an exemplary operation of one exemplary embodiment of the present invention when processing a destroy or delete user space operation.

DETAILED DESCRIPTION OF THE PREFERRED EMBODIMENTS

Figure 1:
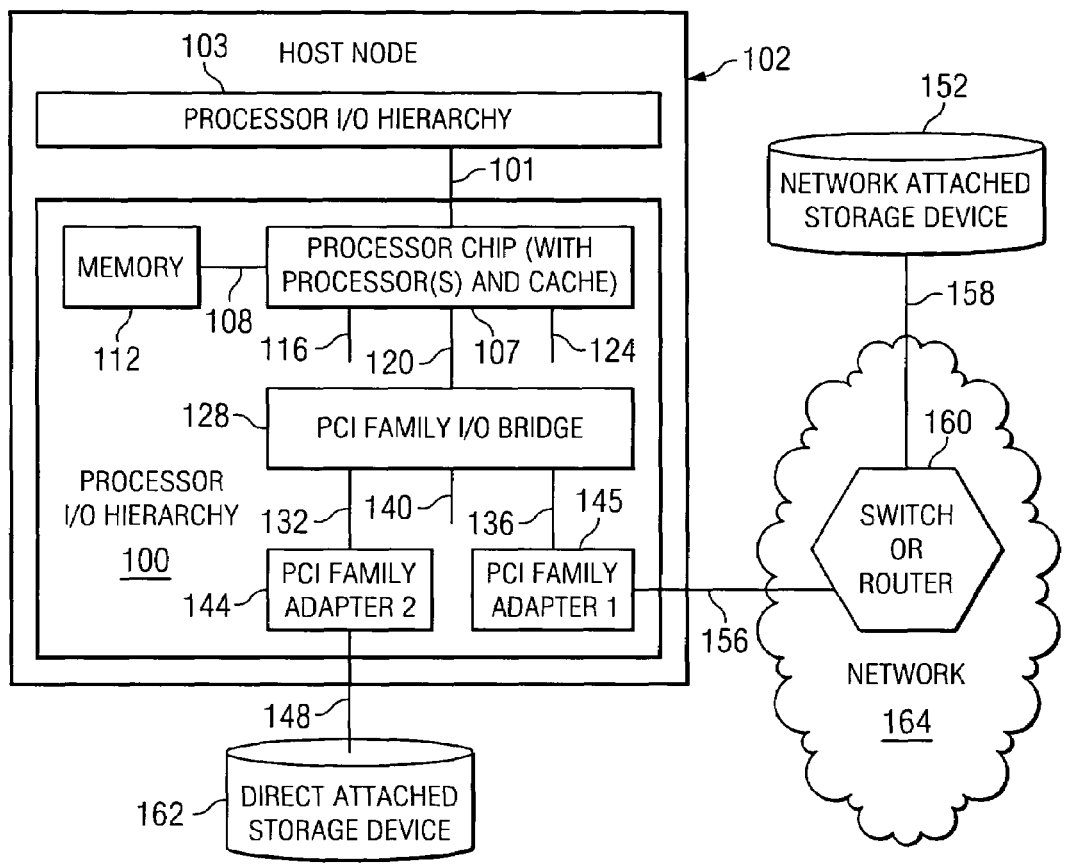
FIG. 1 is a functional block diagram of a host processor node in accordance with an exemplary embodiment of the present invention.

The present invention applies to any general or special purpose host that uses an I/O adapter, such as a PCI family I/O adapter, virtual I/O adapter, endpoint device, virtual endpoint device or the like, to directly attach storage or to attach storage through a network. The network may consist of endnodes, switches, routers and links interconnecting these components. The network links may be Fibre Channel, Ethernet, InfiniBand, Advanced Switching Interconnect, another standard storage network interconnect, or a proprietary link that uses proprietary or standard protocols. While the depictions and description hereafter will make reference to particular arrangements of networks and host nodes, it should be appreciated that the following exemplary embodiments are only exemplary and modifications to the arrangements specifically depicted and described may be made without departing from the spirit and scope of the present invention.

It is important to note that the present invention can take the form of an entirely hardware embodiment, an entirely software embodiment or an embodiment containing both hardware and software elements. In an exemplary embodiment, the present invention is implemented in software, which includes but is not limited to firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters are coupled to the system to enable the data processing system to become coupled to other data processing systems or remote printers or storage devices through intervening private or public networks. Modems, cable modem and Ethernet cards are just a few of the currently available types of network adapters that may be used with the present invention.

With reference now to the figures, and in particular with reference to FIG. 1, a functional block diagram of a host node is depicted in accordance with one exemplary embodiment of the present invention. In this example, host node 102 includes two processor I/O hierarchies 100 and 103 which are interconnected through link 101. For ease of depicting the elements of the host node 102, only processor I/O hierarchy 100 is completely depicted with processor I/O hierarchy 103 having a similar, although not depicted, arrangement of elements as discussed hereafter.

As shown, processor I/O hierarchy 100 includes a processor chip 107 which includes one or more processors and their associated caches. Processor chip 107 is connected to memory 112 through a link 108. One of the links on the processor chip, such as link 120, connects to a PCI family I/O bridge 128. The PCI family I/O bridge 128 has one or more PCI family (PCI, PCI-X, PCI-Express, or any future generation of PCI) links that are used to connect other PCI family I/O bridges or a PCI family I/O adapter, such as PCI family adapter 1 145 and PCI family adapter 2 144, through a PCI link, such as links 132, 136, and 140. A PCI family adapter, such as PCI Family Adapter 1 145, may be used to connect to a network attached storage 152 through a network link, such as link 156 to network 164, that connects to either a switch or router 160, which in turn connects to the network attached storage 152 via link 158. A PCI family adapter, such as PCI family adapter 2 144, may also be used to connect a direct attached storage device 162 through a link 148.

It is important to note that a PCI Family Adapter, such as PCI Family Adapter 1 145 or PCI Family Adapter 2 144, may be integrated with other components on the host node 102. For example, PCI family adapter 1 145 or PCI family adapter 2 144, may be integrated with PCI family I/O bridge 128. Another example is that the PCI family adapter, such as PCI family adapter 1 145 or PCI family adapter 2 144, may be integrated with processor chip 107.

While the exemplary embodiments of the present invention will be described with regard to a PCI family adapter, it should be appreciated that the present invention is not limited to this type of adapter. Rather, the physical I/O adapter may be any type of I/O adapter including a PCI family adapter, a virtual I/O adapter, an endpoint device, a virtual endpoint device, a virtual I/O adapter endpoint device, or the like. One example of a virtual I/O adapter that may be used with the present invention is described in, for example, commonly assigned and co-pending U.S. patent application Ser. No. 11/065,829 entitled "Data Processing System, Method and Computer Program Product for Creation and Initialization of a Virtual Adapter on a Physical Adapter that Supports Virtual Adapter Level Virtualization," filed on Feb. 25, 2005, which is hereby incorporated by reference. Other types of I/O adapters may be used without departing from the spirit and scope of the present invention.

Figure 2:
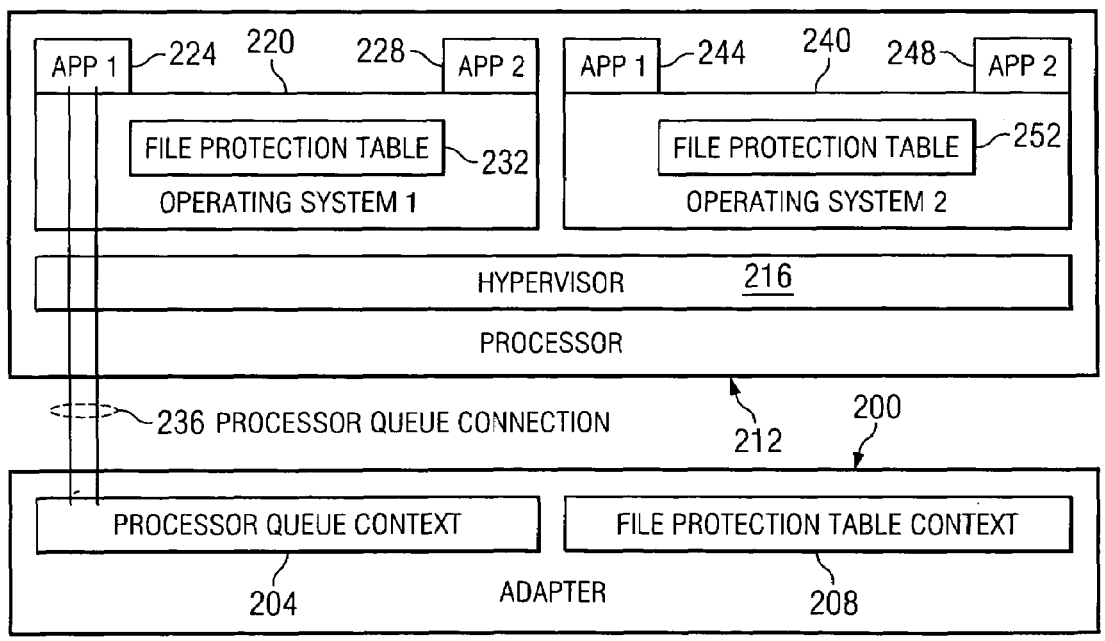
FIG. 2 is a diagram illustrating the primary operational elements of a host processor node used to enable out of user space file name based storage I/O access in accordance with an exemplary embodiment of the present invention.

With reference now to FIG. 2, a functional block diagram of system components associated with one exemplary embodiment of the present invention is depicted. In the depicted example, physical I/O adapter 200 is an example of a PCI adapter, such as PCI family adapter 1 145 or PCI family adapter 2 144 in FIG. 1.

In this example, physical I/O adapter 200, shown in FIG. 2, includes one set of processing queues (PQs), such as processing queue set 236, and their associated processing queue context, such as PQ context 204. The processing queues (PQs) may include, for example, a work queue, such as a send queue and or receive queue, and a completion queue. The work queue is used to submit file name based I/O storage requests directly to the physical I/O adapter. The file names in the file name based I/O storage requests are translated into Linear Block Addresses, using the mechanisms of the present invention, for directly accessing portions of a storage device. A Linear Block Address (LBA) is the index of a block, i.e. a fixed size portion of a storage device, from the logical beginning of the storage device. The completion queue is used to communicate completion of a work queue entry back to the application instance that submitted the file name based I/O storage request.

The physical I/O adapter 200 also has a file protection table (FPT) context, such as FPT context 208, which is used to contain the context for a host resident file protection table, such as FPT 232 or FPT 252. The FPT context 208 may also be used to contain the FPT 232 or 252 itself or a cache of entries from the host resident FPT 232 or FPT 252.

FPT 232 and 252 reside in an Operating System (OS), such as OS 1 220 or OS 2 240. The OS, e.g., OS 1 220 or OS 2 240, may reside above a hypervisor 216, which is software, firmware or a mix of the two that manages the partitioning and virtualization of physical hardware resources and controls the OS execution. The OS may host one or more middleware or application instances. In FIG. 2, OS 1 220 is hosting two middleware or application instances App 1 224 and App 2 228. Similarly, OS 2 240 is hosting application App 1 224 and App 2 228. The OS runs on a processor, such as processor 212.

A middleware or application instance, such as App 1 224 uses a set of processing queues, such as processing queue set 236, to pass file name based I/O storage requests to the physical I/O adapters. When the physical I/O adapter 200 processes a file name based I/O storage request, the physical I/O adapter 200 uses a key passed in the file name based I/O storage request to look up an entry in the FPT context 208. If the FPT context 208 is associated with the same protection domain as the PQ Context 204, used for the processing queue, then the file name based I/O storage request is processed. Otherwise, the file name based I/O storage request is completed in error.

Figure 3:
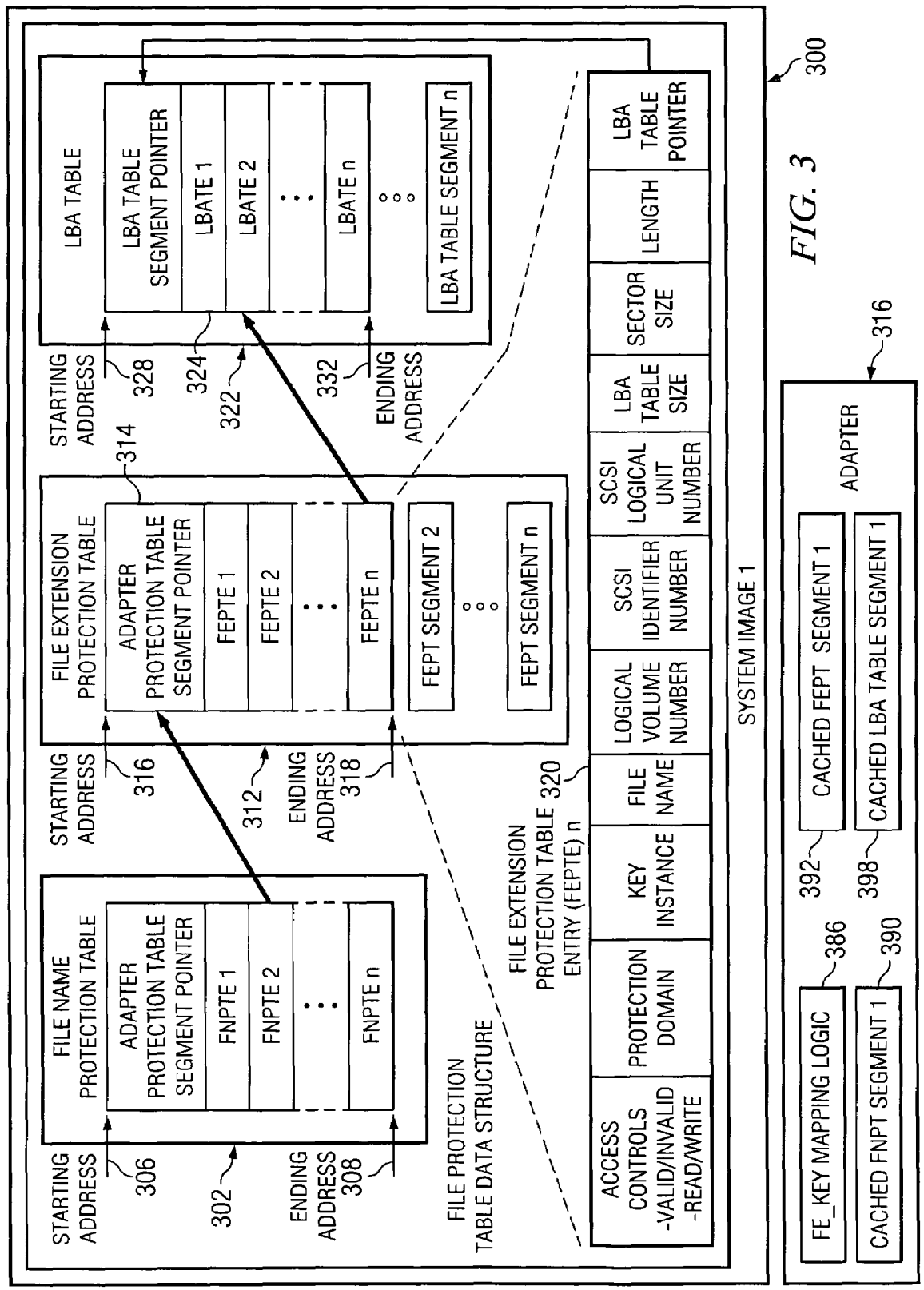
FIG. 3 is a diagram illustrating exemplary control structures used to translate and protect file name based storage in accordance with an exemplary embodiment of the present invention.

Turning next to FIG. 3, an example of a file protection table (FPT) is depicted. Three tables are shown in FIG. 3: the file name protection table 302, the file extension protection table 312, and the Linear Block Address (LBA) table 322, which together may constitute a file protection table data structure. The file name protection table 302 contains an entry for each file managed by the file system of the operating system or system image 300. Entries in the file name protection table 302 point to segments of the file extension protection table 312 corresponding to the file represented by the file name protection table entry.

The file extension protection table 312 contains an entry for each file extension. Each of these entries describes the access controls, file name, a pointer to the Linear Block Address (LBA) table 322, which contains the range of LBAs associated with a corresponding file extension protection table entry, and other fields that will be covered later in this description. In the depicted example, the file extension protection table 312 contains entries for each logical volume (LV) and thus, the file extension protection table 312 is an LV file extension protection table 312.

The file extension protection table 312 may be segmented into a set of file extension protection table segments, such as file extension protection table segment 1 314. The segments may be interconnected using several data structures, including a B-tree, a tree made up of pointers in non-leaf nodes and pointers in leaf nodes, simple linked list, or the like. In the depicted example, file extension protection table segment 1 314 uses a simple linked list where the first entry in the table is a pointer to the next table that contains file extension protection table entries.

File extension protection table entry N 320 depicts an example entry in the file extension protection table segment, such as file extension protection table segment 1 314. Each entry in the file extension protection table segment 1 314 contains a set of fields that are used to define that entry. File extension protection table entry N 320 contains the following fields: Access Controls, Protection Domain, Key Instance, File Name, Logical Volume Number, SCSI Identifier Number, SCSI Logical Unit Number, LBA Table Size, Sector Size, Length, LBA Table pointer.

In one exemplary embodiment, the adapter's FE_Key mapping logic 386, which may be logic in a processor of the I/O adapter or a separate dedicated logic unit, for example, performs all the checks of the fields in the file extension protection table entry, e.g., file extension protection table entry N 320. Any checks that are not passed by the FE_Key mapping logic 386 result in an operation being completed in error. In the event of an error, the operating system (OS) may either tear down the middleware or application instance that passed in the operation or take a less drastic measure, such as returning the operation with an error completion.

The Access Controls field describes whether the file extension protection table (FEPT) entry is valid or not and what type of operations may be performed on the FEPT entry. The possible operations that may be performed on the entry are: Read, Write, and Read/Write. If the file name based I/O storage request passed in by the middleware or application instance accesses a valid FEPT entry, then the operation passes the valid/invalid check. If the file name based storage I/O request passed in by the middleware or application instance attempts to perform a Read access operation and the FEPT entry has the valid bit set, then the operation passes this check. If the file name based storage I/O request passed in by the middleware or application instance attempts to perform a Write access operation and the FEPT entry has the Read/Write bit set, then the operation passes this check.

The Protection Domain field is used to associate a FEPT entry with a processing queue (PQ) context. That is, if the PQ context, used by the middleware or application instance to pass in a file name based storage I/O requests, contains the same value in its protection domain field as the protection domain field of an FEPT entry, then the two are associated and the operation passes this check. If there is a mismatch between these protection domains in the PQ context and the FEPT entry, then the operation fails this check.

The Key Instance is used to compare the file extension key passed in a file name based I/O storage request by the middleware or application instance to the file extension key stored in the FEPT entry. If the two match, the operation passes this check. If the Key Instance does not match the storage key passed in the file name based storage I/O request, then the operation does not pass this check.

The file extension key, or "FE_Key", has two fields—a first field is an index, e.g., offset, into the FEPT, and the second field is a key instance which is to be compared with a key instance in the FEPT entry that is pointed to by the first field. When the middleware or application instance submits a file name based I/O storage request, the adapter uses the file name and the first field to obtain an entry from the FEPT. This may be done, for example, by using the file name, or a file name key, to identify an entry in the file name protection table 302 which points to a starting address of a segment of the FEPT 312. The index or offset in the first field of the file extension key may then be used to identify a particular entry in the FEPT 312. The adapter then compares the key instance inside the FEPT entry with the second field that was passed in by the middleware or application instance.

The File Name field is optional and, if included, is used for identifying the file name and/or file name key associated with the FEPT 312 entry. The File Name field may be used to perform a check against a file name or file name key passed in a file name based storage I/O request. If the two match, then the operation passes the check; otherwise if the two do not match, the operation fails the check.

The Logical Volume Number is optional and, if included, it is used to compare the LV number passed in a file name based storage I/O request by the middleware or application instance to the LV number stored in the LV file extension protection table entry. If the two match, the operation passes this check. If the Logical Volume Number does not match the LV number passed in by the file name based storage I/O request, then the operation fails this check.

The SCSI Identifier Number (ID) and SCSI Logical Unit Number (LUN) are used to associate the entry with a specific SCSI device and a specific LUN within that device, respectively.

The LBA Table Size is used to define the maximum number of entries each LBA table segment that is associated with the FEPT entry, such as LBA table segment 1 324, may contain. The Sector Size is used to define the size of each sector on the disk associated with the FEPT entry. The Length field is used to define the total length of the set of disk LBAs associated with the FEPT entry.

The LBA Table Pointer of the FEPT entry 320 points to one or more corresponding LBA table entries in the LBA table 322. Thus, with the LBA Table Pointer field, the linear block addresses associated with a FEPT entry in the FEPT 312 may be identified in order to provide access to linear block addresses of storage locations on the physical storage device associated with the processing queue from which a file name based I/O request is received in the adapter 316.

The LBA table 322 may also be segmented into a set of LBA table segments, such as LBA table segment 1 324. The segments may be interconnected using several data structures, including a B-tree, a tree made up of pointers in non-leaf nodes and pointers in leaf nodes, a simple linked list, or the like. In the depicted example, LBA table segment 1 324 uses a simple linked list where the first entry in the table is a pointer to the next table that contains LBA table entries.

Each entry in the LBA table segment, such as LBA table segment 1 324, describes the range of disk Linear Block Addresses (LBAs) associated with that entry. For this description, the entry may use a starting LBA and a length, a starting LBA and an ending LBA, or the like.

The physical I/O adapter, such as adapter 316, may choose to store the entire file protection table, a portion of the file protection table, or none of the file protection table. Adapter 316 is shown with a file name protection table cache and a file extension protection table cache that hold one segment, such as cached file name protection table segment 1 390 and file extension protection table segment 1 392.

Similarly, the adapter 316 may choose to store the entire LBA table, a portion of the LBA table, or none of the LBA table. In the depicted example, adapter 316 is shown with an LBA table cache that holds one segment, such as cached LBA table segment 1 398.

Figure 4:
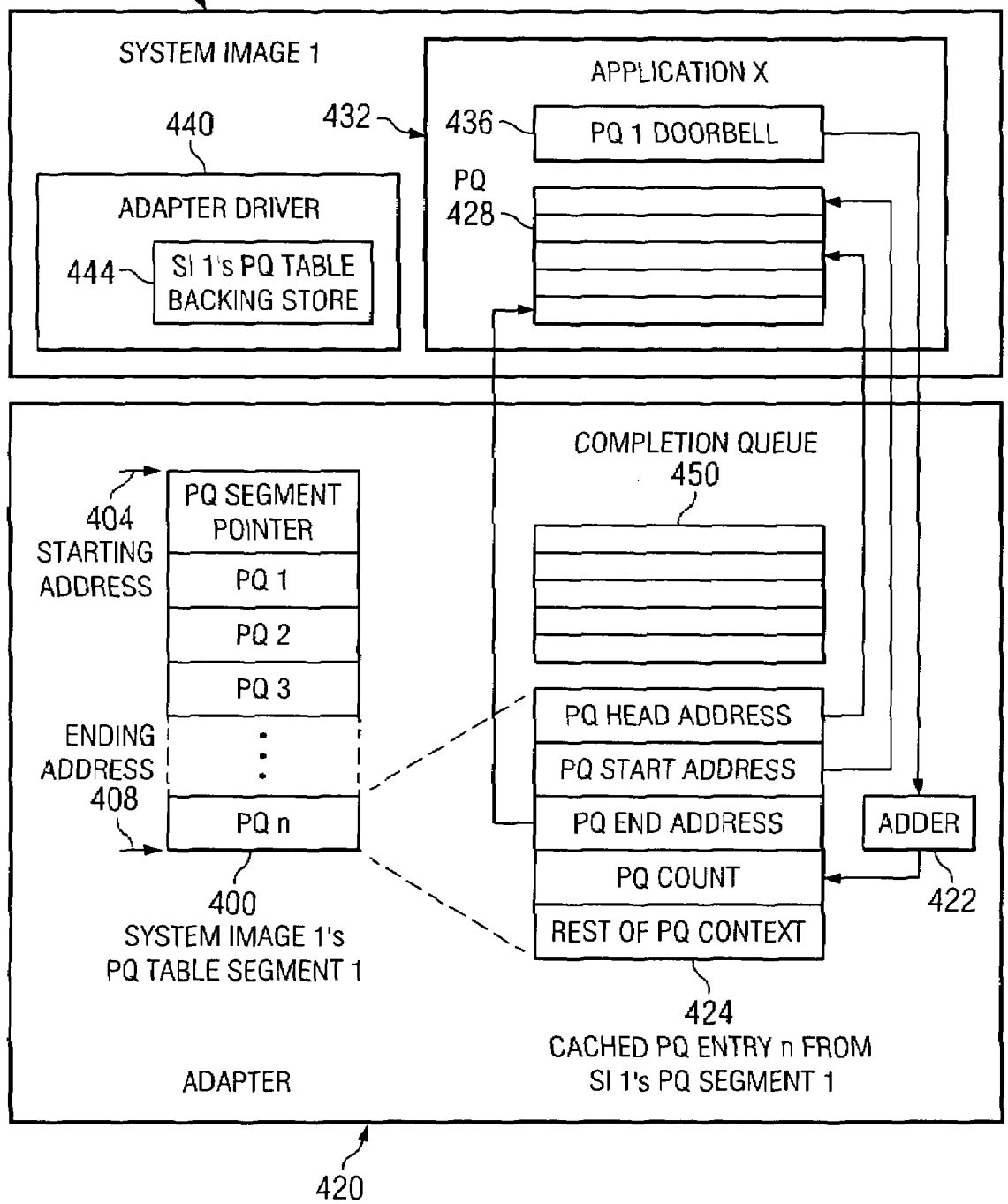
FIG. 4 is a diagram illustrating exemplary control structures used to pass a storage request from a user space middleware or application instance to a storage adapter in accordance with an exemplary embodiment of the present invention.

With reference next to FIG. 4, an exemplary diagram of exemplary control structures used to pass a file name based I/O storage request for a user space middleware or application instance to a physical I/O adapter in accordance with an exemplary embodiment of the present invention is shown. For illustration purposes, a system image, which may be an operating system, such as Windows XP™, AIX™, Linux™, etc., or a special purpose software image, such as a file name based I/O storage server or file mode I/O storage server, for example, is shown with an application that uses a storage or network adapter to invoke storage operations from a storage device. For purposes of the following description, the terms "system image" and "operating system" may be used interchangeably to refer to a system image, i.e. the current contents of system memory, which may include the operating system and any running application instances.

The system image, such as system image 1 412, has a device driver, such as adapter driver 440, associated with the storage adapter 420. The adapter driver 440 may contain a processing queue (PQ) table backing store 444 which contains copies of the entries in the adapter's PQ table, e.g., system image 1's processing queue table segment 1 400.

When application instance X 432 performs a file name based I/O access, the application instance informs the associated adapter 420 through the use of a processing queue (PQ) doorbell 436. For example, PQ 1 Doorbell 436 informs the adapter 420 that there is a storage work request in the send queue 428 of the processing queue set used to communicate between application instance X 432 and adapter 420.

The data from PQ 1 Doorbell 436 provides the number of work requests that need to be added by an adder 422 to the current number of pending work requests in the adapter 420. That is, a file name based I/O request sent generated by middleware or an application instance may be comprised of a plurality of actual work requests that are stored in the send queue as work queue entries. The PQ 1 Doorbell 436 identifies the number of work requests that are part of the file name based I/O request.

The number of work requests is provided as a PQ Count field that is stored in the associated processing queue table entry PQ N associated with the system image, such as cached PQ entry N from system image 1's PQ Segment 1 424. Once the storage work request is completed, a message is added to a completion queue 450 which is used to inform the application that the work request has been completed.

As shown in FIG. 4, the cached PQ entry N from system image 1's PQ segment 1 424 includes PQ context information including a PQ head address, PQ start address, PQ end address, PQ count, and additional PQ context information. The PQ start address field stores the system memory address of the first work queue entry in the application's processing queue 428. The PQ End address field stores the last system memory address that is associated with the last work queue entry of the processing queue 428. The PQ head address field stores the system memory address of the next processing queue entry that the adapter is going to process. The adapter changes the PQ head address as it processes processing queue entries in the circular processing queue. The PQ count field stores the number of processing queue entries that have not been processed by the adapter yet, but have been posted by the application instance 432.

Figure 5:
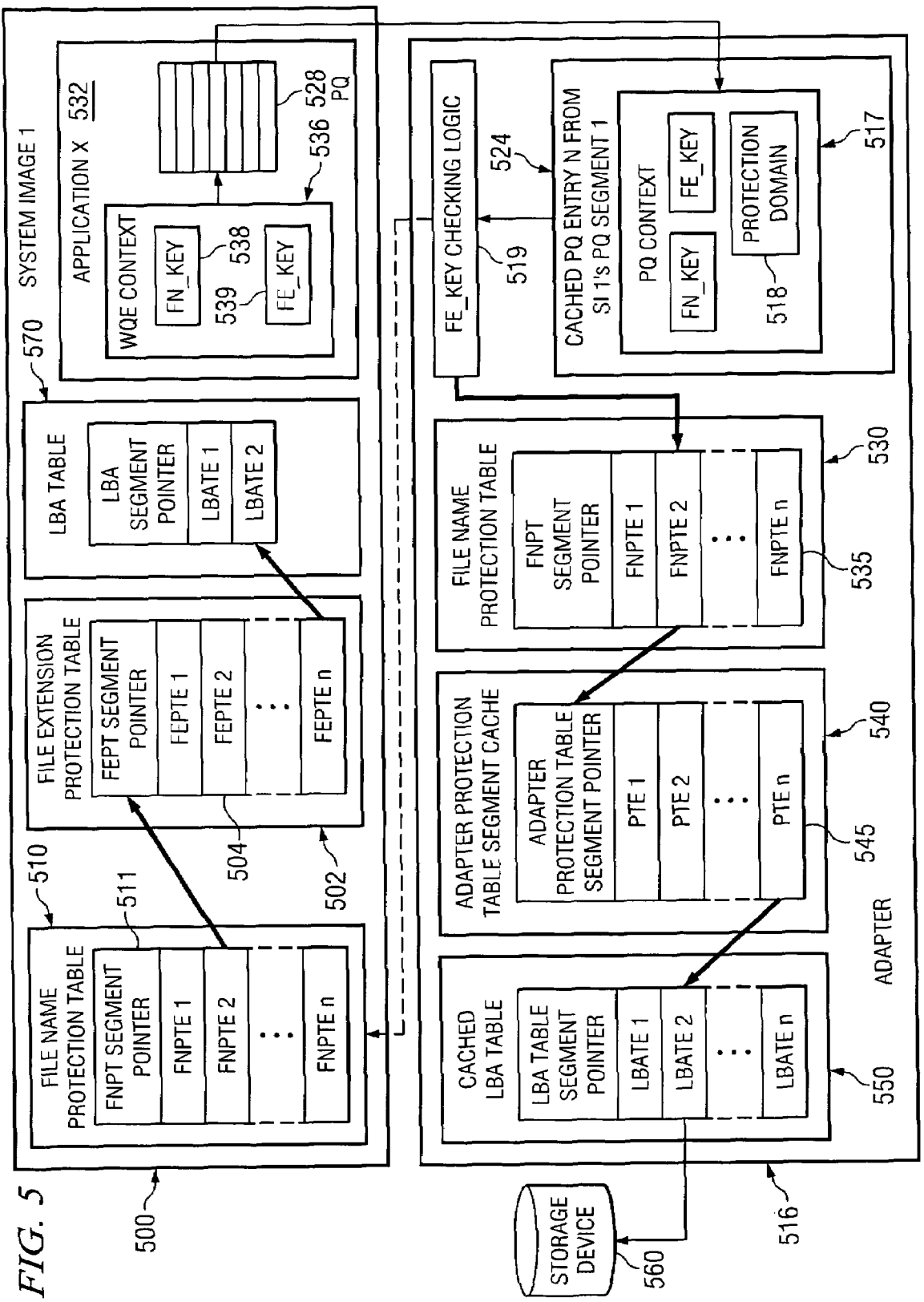
FIG. 5 is a diagram illustrating exemplary control structures used to assure that a file name based storage I/O request submitted by a user space middleware or application instance is allowed to reference the file(s) referenced in the file name based storage I/O request in accordance with an exemplary embodiment of the present invention.

With reference next to FIG. 5, a description of exemplary control structures that are used to assure that a file name based I/O storage request, submitted by a user space middleware or application instance, is authorized to reference the storage device areas referenced in the file name based I/O storage request, in accordance with one exemplary embodiment of the present invention, is provided. FIG. 5 focuses on the protection of the storage blocks associated with the application instance, by ensuring that only the application instance associated with those storage blocks is the only application instance that may access those storage blocks on the storage devices.

As shown in FIG. 5 a system image 1 500 hosts an application instance X 532. This application instance X 532 performs a file name based I/O storage request using the mechanism described above with reference to FIG. 4. This mechanism uses a processing queue 528 to submit file name based I/O storage requests, as work queue entries (WQEs), such as WQE 536, to the desired physical I/O adapter, such as adapter 516. A file name based I/O storage work request is put into the send queue 528 which is a work queue that is part of the processing queue set associated with application instance X 532 and adapter 516. The processing queue context 517 on the adapter 516, such as that in the cached PQ entry N from system image (SI) 1's PQ Segment 1 524, contains a protection domain field 518.

When the application X 532 submits a file name based I/O storage request, such as file name based I/O storage request 536, part of the request will contain a FN_Key 538 and a FE_Key 539. The FN_Key 538 is used by the system image 500 as an index into the file name protection table (FNPT) 510 or by the adapter 516 as an index into the cached file name protection table segment 535 in FNPT cache 530 of adapter 516, depending upon the particular implementation of the present invention. For example, the FN_Key 538 may be an offset into the FNPT 510 or cached FNPT segment 535 which permits the identification of a particular entry in the FNPT 510 or cached FNPT segment 535 corresponding to a file name of a file that is the target of a file name I/O storage work request.

The FE_Key 539 is used by the system image 500 to access a particular entry in a segment of the file extension protection table (FEPT) 502 referenced by the FNPT entry corresponding to the FN_Key 538. Alternatively, in a preferred embodiment, the FE_Key 539 may be used by the adapter 516 to access a particular entry in a cached segment of the FEPT 545 corresponding to a cached FNPT entry identified by the FN_Key 538.

The accessing of a cached file name protection table segment 535 and a cached file extension protection table segment 545 are performed only if the required segments are present in the adapter's file name protection table cache 530 and file extension protection table segment cache 540, respectively. If the required segments are not present within the adapter's caches 530 and 540, a loading of the required file name and/or file extension protection table segments, from the system image 500, into the adapter's caches 530 and 540 may be required, for example. Alternatively, the FE_Key checking logic 519 may access the file name and/or file extension protection table segments, e.g., file name protection table segment 511 and/or file extension protection table segment 1 504, in the system image 500 directly.

The FN_Key and FE_Key are generated when an application instance or middleware requests the allocation of a file in the file system of the operating system. That is, the operating system will allocate the appropriate blocks of the storage device for storing the file and will generate entries in the FNPT and FEPT for the file. As part of the generation of these entries, the operating system will assign an FN_Key and FE_Key to the entries in the tables and report these keys back to the requesting application instance, middleware, etc. In addition, file extension protection table entries, and thus, FE_Keys, may further be generated and assigned as new file extensions are added to an existing file, for example when the size of the file increases beyond an already allocated portion of the storage device. The application instance, middleware, etc. may then use these keys when submitting file name I/O requests as work queue entries in the processing queue associated with the application instance, middleware, or the like.

As mentioned above, the FN_Key and FE_Key are used to lookup entries in the file name protection table 510 and file extension protection table 502, or cached file name protection table segment 535 and cached file extension protection table 545, associated with the FN_Key and FE_Key, respectively. For example, the FN_Key may have a value that is used to compare against FN_Key instances stored in entries of the file name protection table 510/530. Similarly, the FE_Key may have a value that is used to compare against the key instance fields of the file extension protection table entries in the FEPT segment 504/540 to identify an entry that matches the FE_Key. Alternatively, the FN_Key and FE_Key may be offsets into the tables that are used to offset from a segment start address to a particular entry in the tables, for example.

In a preferred embodiment of the present invention, FE_Key checking logic 519 in the adapter 516 is used to perform the lookup of entries in the FNPT and FEPT based on the FN_Key and FE_Key as described above. Thereafter, the FE_Key checking logic 519 performs a protection domain check to verify that the protection domain coming from the PQ context 524 in adapter 516 matches the protection domain in the protection table entry N 520 that is pointed to by the FN_Key and FE_Key in the file name based I/O storage request 536. Any checks that are not passed by the FE_Key checking logic 519 result in an operation being completed in error. In such a case, the operating system, e.g., system image 1 500, may either tear down the middleware or application instance, e.g., application instance X 532, that passed in the operation, or take a less drastic measure, such as returning the operation with an error completion.

Assuming that all of the checks previously discussed above are passed, the file name based I/O storage request is processed by the adapter 516 to either read, write or read/write data to/from the linear block addresses of the physical storage device 560, e.g., the hard disk, referenced by the entry in the cached LBA table segment 550, or alternatively the LBA table segment 570 associated with the system image 500, corresponding to the file extension protection table entry in the FEPT segment.

The present invention uses the FNPT, FEPT and LBA table to manage the "user space" and "out of user space" file name based I/O operations. User space is the portion of system memory used to run user applications. File name based I/O operations that are performed in "user space" include operations regarding the creation, modification, querying and deletion of FNPT, FEPT and LBA table entries, the submission and processing of work queue requests by applications, other I/O operations performed by a system image, and the like. With regard to the present invention, file name based I/O operations that are performed "out of user space" include operations performed in the I/O adapter 516 to facilitate validation and execution of I/O requests to physical storage devices, such as physical storage device 560.

The data structures and mechanisms described above are used to control access to portions of storage device 560 by applications, such as application X 532, during file name based direct I/O operations between the application instance and the physical I/O adapter. The following description provides details regarding the way in which resources are allocated, work queue entries are created, and completion queue entries are processed in accordance with the mechanisms previously described above.

Figure 6:
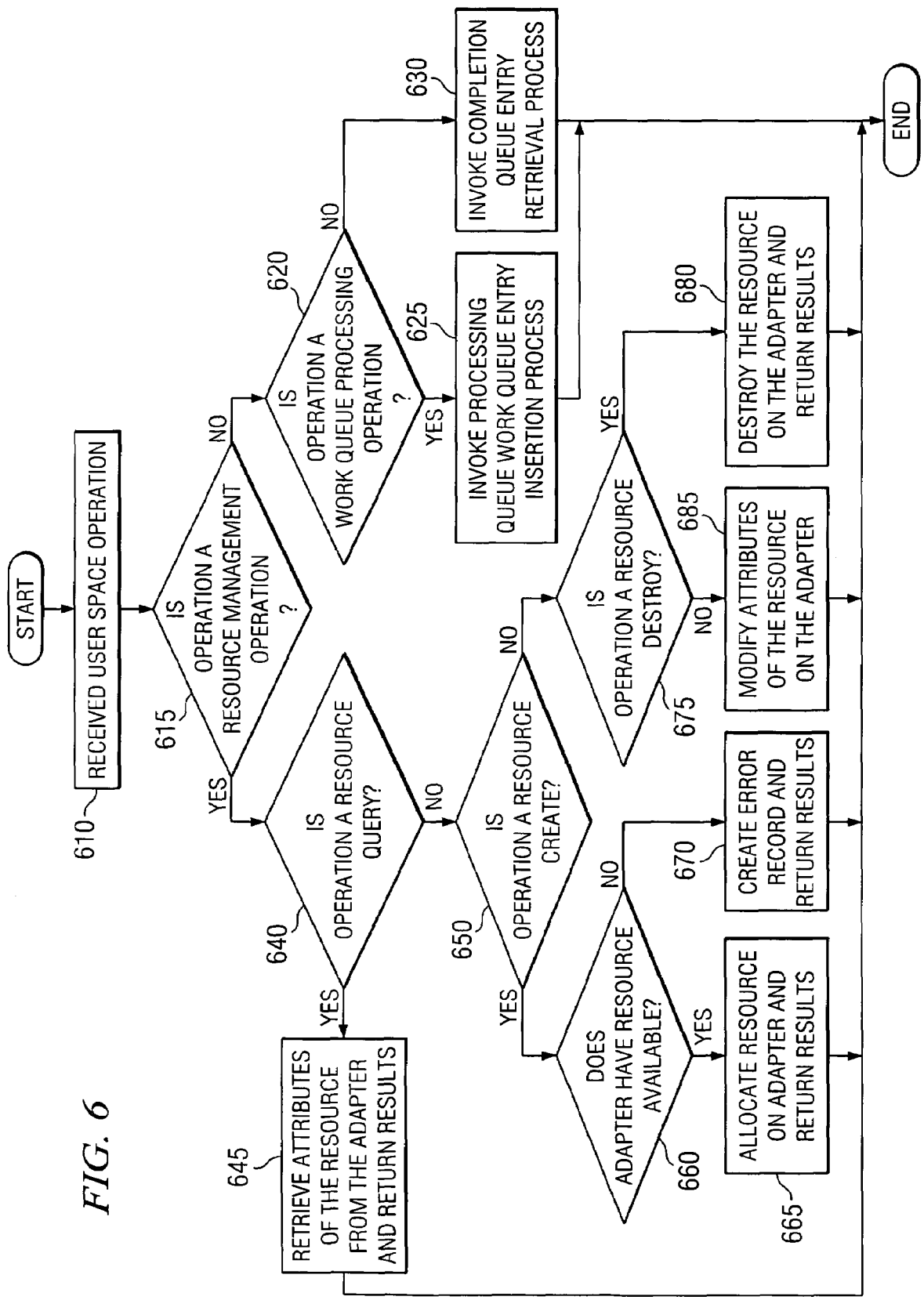
FIG. 6 is a flowchart outlining an exemplary operation for handling an invocation of a user space operation in accordance with an exemplary embodiment of the present invention.

FIG. 6 is a flowchart outlining an exemplary operation for handling an invocation of a user space operation in accordance with an exemplary embodiment of the present invention. In an exemplary embodiment of the present invention, the operations outlined in FIG. 6 are performed by a system image or operating system in response to an invocation of a user space operation. While the exemplary embodiments have these operations being performed in a system image or operating system, the present invention is not limited to such. Rather, for example, the operations may be performed in a user space application, a hypervisor, or the like.

It will be understood that each block, and combination of blocks, of the flowchart illustration in FIG. 6, and the flowchart illustrations in subsequent figures described hereafter, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 6, the operation starts with an invocation of a user space operation (step 610). This invocation may be performed, for example, by way of a user management interface, an automated script/workflow, or the like. The invocation may be made via an application instance, the system image, or the like. One example of a user management interface which may perform such an invocation is the raw mode I/O in the Advanced Interactive Executive (AIX) operating system. Other operating systems may have similar interfaces. This user management interface is invoked for management operations like create volume, destroy volume as well as functional operations such as read or write.

A determination is made as to whether the user space operation that is being invoked is a resource management operation (step 615). The operating system is there to restrict access to the underlying hardware so that an application cannot access resources associated with another application. Thus, a resource management operation is one that must be performed by the operating system because there is no other alternative for restricting the application's access to the resources it owns. Examples of such operations include create volume, query volume, destroy volume. A non-resource management operation is one where, through the mechanisms of the present invention, a physical adapter can restrict the application's access to the resources it owns. Examples of non-resource management operations are read and write operations.

If the operation is not a resource management operation, then the operation is a processing queue operation. As a result, a determination is made as to whether the operation is for work queue processing, e.g., processing associated with an entry in a send queue (step 620). If so, a work queue entry insertion process is invoked for creating a work queue entry (step 625). This work queue entry insertion process is used to submit work requests to the I/O adapter as discussed previously and outlined hereafter in FIG. 7.

If the operation is not for work queue processing, then a completion queue entry retrieval process is invoked (step 630). The completion queue entry retrieval process is used to retrieve completion queue entries from the physical I/O adapter for work requests that have been completed by the physical I/O adapters, as described in greater detail hereafter.

If the user space operation is a resource management operation (step 615), then a determination is made as to whether the operation is a resource query operation (step 640). If the operation is a resource query operation, then the system image/operating system retrieves the attributes of the resource from the physical I/O adapter and returns the results to the element, e.g., system image or application instance, that invoked the user space operation (step 645). This operation is used to obtain attribute information from, for example, LBA table entries and file extension protection table entries, as discussed in greater detail hereafter.

If the operation is not a resource query operation, then a determination is made as to whether the operation is a resource create operation (step 650). If the operation is a resource create operation, a determination is made as to whether the physical I/O adapter has resources available to allocate to the element invoking the user space operation (step 660). For example, as discussed above, each file extension protection table entry in the adapter protection table contains a LBA table size, sector size and length. These parameters may limit the number of resources available by the adapter for allocation. Thus, the physical I/O adapter may determine that sufficient resources are not available for allocation to the element invoking the user space operation.

If there are sufficient resources available to allocate, then these resources are allocated on the physical I/O adapter and the physical I/O adapter returns the results of this allocation to the invoking element (step 665). If there are not sufficient resources available to allocate, then an error record may be generated and returned to the element invoking the user space operation (step 670).

If the operation is not a resource create operation (step 650), then a determination is made as to whether the operation is a resource destroy operation, also referred to herein as a "delete" or "de-allocation" operation (step 675). If the operation is a resource destroy operation, then the resource is destroyed on the physical I/O adapter and the results of the operation are returned to the element invoking the user space operation (step 680). If the operation is not a resource destroy operation, then the operation is a resource modify operation and the attributes of the designated resource are modified on the physical I/O adapter (step 685). The operation then terminates.

FIG. 7 is a flowchart outlining an exemplary operation of the present invention when an invoked user space operation is a work queue operation requiring generating and processing or work queue elements. The operation shown in FIG. 7 corresponds to step 625 in FIG. 6, for example.

As shown in FIG. 7, the operation starts when the application instance adds one or more work queue entries to a work queue, e.g., send queue, of a processing queue set associated with the application instance and adapter (step 710). As discussed above, this work queue entry includes an FN_Key, FE_Key, a protection domain, an identifier of the I/O operation that is to be performed, and optionally a logical volume number and/or SCSI LUN.

A processing queue doorbell message is sent from the application instance to the physical I/O adapter to inform the physical I/O adapter of the newly posted work request (step 715). In one exemplary embodiment of the present invention, the sending of the processing queue doorbell message involves performing a programmed I/O write to a doorbell address associated with the work queue. As discussed above, the doorbell message is used to add additional work requests to the processing queue count in the cached processing queue entry of the physical I/O adapter.

Thereafter, the physical I/O adapter performs validation checks of the information stored in the work queue entry or entries against the data stored in the file protection table entries, i.e. the file name protection table entries and file extension protection table entries (step 720). As discussed above, these checks may include looking up an entry in the file name protection table based on a FN_Key to thereby identify a segment of the file extension protection table, and then looking up a file extension protection table entry within the identified segment based on the FE_Key. The checks may further include, for example, checking for matches between protection domains, logical volume numbers, SCSI identification numbers, SCSI logical unit numbers, and the like, in the identified file extension protection table entry and the similar values in the work queue entry. These checks will be described in greater detail hereafter.

A determination is made as to whether all of the checks are completed successfully (step 725). If all of the checks complete successfully, the physical I/O adapter uses the Linear Block Address (LBA) table to translate the file referenced within the identified file extension protection table entry into LBAs, e.g., by way of a LBA table pointer, and performs LBA containment checks (step 730). Because the application instance operates in a different space than the storage device, the addresses referenced via the file name based I/O storage request generated by the application instance may differ from the actual physical addresses of the storage device. The LBA table entries provide information regarding the actual physical LBAs for the storage device that are allocated to a particular file, as determined from the corresponding file extension protection table entry. Thus, a mapping between the file referenced in the file name based I/O storage request, and thus the work queue entries, and the LBAs referenced in the LBA table may be performed, by way of the file name protection table and file extension protection table, in order to determine the actual physical LBAs to which the file name based I/O operations are to be directed.

For example, the LBA table pointer in the file extension protection table entry may be used to access one or more entries in the LBA table that correspond to the file extension protection table entry. From the LBA table entries corresponding to the file extension protection table entry, the range of disk Linear Block Addresses (LBAs) corresponding to the file extension protection table entry may be identified. These LBAs may then be used to map the file referenced in the work queue entry to LBAs of the physical storage device.

Returning to FIG. 7, a determination is made as to whether the LBA containment checks complete successfully (step 735). These LBA containment checks are checks to determine if the mapped LBAs corresponding to the file referenced in the file name based I/O operations, and thus the work queue entry, fall within the LBAs allocated to the application instance as identified in the corresponding LBA table entry. For example, if the application instance is attempting to access portions of the storage device that are not allocated to that application instance, then at least one of the LBA containment checks will fail. If any of the validation checks or the containment checks are not completed successfully, an error result is generated (step 740).

If the validation and containment checks complete successfully, the physical I/O adapter marks the work queue entry as valid (step 750) and performs all functions, e.g., read, write, read/write, associated with the work queue entry (step 755). Thereafter, or after the generation of an error result in step 740, the physical I/O adapter creates a completion queue entry associated with the work queue entry and performs a direct memory access (DMA) operation to send the completion queue entry to the application instance (step 760).

A determination is then made as to whether a completion queue event was requested (step 765). If so, the physical I/O adapter generates a completion queue event (step 770) and the operation terminates. That is, after work requests that were posted to the send and receive queues of the processing queue are completed, a completion message is put into the completion queue and if the application requests it, an event may be generated.

It is important to note in FIG. 7 that after steps 710 and 715, the system image or operating system is not involved in the processing of the work queue entry. To the contrary, the physical I/O adapter performs all of the necessary operations for performing the validity and containment checks, performing the functions associated with the work queue entry, generating a completion queue entry, and sending the completion queue entry to the host. Thus, the many task switches experienced in known systems during an I/O operation, as described in the Background of the Invention above, are avoided by the present invention since it is not necessary to involve the operating system or system image during the actual checking and processing of the I/O operation after it has been submitted by the operating system or system image. The operating system or system image is only again utilized to retrieve a completion queue entry associated with the work queue entry that was processed, and pass this completion queue entry to the application.

Exemplary validation checks that are performed to determine if a work queue entry is valid and may be processed by the physical I/O adapter are illustrated in FIG. 8. The validation check operation outlined in FIG. 8 may correspond, for example, to steps 720 and 725 in FIG. 7.

As shown in FIG. 8, the operation starts by retrieving the next work queue entry for the file name based I/O operation from the work queue, e.g., send queue (step 810). This work queue entry is then checked against a cached or system image resident file name protection table entry and file extension protection table entry to determine if the corresponding file name based I/O operation can be performed. First, the FN_Key in the work queue entry is used to lookup a file name protection table entry corresponding to the FN_Key (step 812). The file name protection table entry includes a pointer to the starting address of a segment of the file extension protection table corresponding to the file name protection table entry (step 814). A FE_Key in the work queue entry is then used to identify an entry in the identified segment of the file extension protection table (step 816). The data for the fields of the identified file extension protection table entry is then retrieved for use in authenticating the application instance's access to the portions of the storage device corresponding to the file identified in the work queue entry by the FN_Key (step 820).

The above identification of entries in the file name protection table and file extension protection tables may be performed in a number of different ways depending upon the particular implementation of the present invention. In one example, the FN_Key and FE_Key are offsets into the tables from an identified starting address. In another example, the FN_Key and FE_Key in the work queue entry have values that are compared against the key instances in entries of the file name protection table and file extension protection table to identify entries having matching values. Other mechanisms for identifying a particular entry in each table may be used without departing from the spirit and scope of the present invention.

After retrieval of the data from the identified file extension protection table entry, a determination is made as to whether a valid file extension protection table entry has been found by the above lookup operation (step 830). If not, an error result is generated and returned (step 840). As mentioned above, this may be performed by looking at the valid/invalid bit in the access controls of the file extension protection table to determine if this bit has been set to a valid value. Furthermore, if the file extension protection table entry is not valid, the error result may be, for example, tearing down the middleware or application instance that passed in the work request that generated the work queue entry, or may take a less drastic measure such as returning the operation with an error completion.

If a valid file extension protection table entry has been found, a check is then made as to whether the I/O operation that is to be performed in association with the work queue entry is supported by the associated file extension protection table entry (step 850). For example, the access controls of the adapter protection table entry are compared against the I/O operation identifier in the work queue entry to determine if the file extension protection table entry indicates that the I/O operation may be performed or not.

If the I/O operation cannot be performed based on the setting of the access controls in the file extension protection table entry, then the operation generates and returns an error result (step 840). If the I/O operation can be performed as indicated by the file extension protection table entry, then a determination is made as to whether the protection domain of the work queue entry corresponds to the protection domain of the file extension protection table entry (step 860). If the protection domains do not match, then the operation generates and returns an error result (step 840).

If the protection domains do match, then additional checks of additional information in the file extension protection table entry may be made and a determination as to whether these checks are successful or not may be performed (step 870). As mentioned above, these additional checks may include, for example, checking a file name filed of the file extension protection table to determine if the file name matches a file name passed in by the work queue entry, if one is present in the work queue entry. Similarly, if the work queue entry has an associated LV number identifier and/or a SCSI LUN identifier, then additional checks of this information may be made. As with the previous checks, if these checks result in a mismatch between the work queue entry and the adapter protection table entry, then an error result is generated and returned (step 840). It should be appreciated that step 870 is optional and may not be present in all embodiments of the present invention.

If all checks are passed, the work queue entry is preliminarily marked as a valid work queue entry that may be processed by the physical I/O adapter (step 880). This preliminary marking of validity only means that the work queue entry has passed the first set of validity checks. As described above, the work queue entry must also pass containment checks before being processed by the physical I/O adapter. Following step 880, the operation ends with regard to the validity checks but, as shown in FIG. 7, continues to step 730 or 740 in the overall operation.

It should be appreciated that while FIG. 8 illustrates a series of checks that are performed in order to process a file name based I/O operation, the present invention is not limited to the particular series of checks depicted. To the contrary, the operation outlined in FIG. 8 is only exemplary and many modifications may be made without departing from the spirit and scope of the present invention. For example, the order in which the various validity checks are performed may be modified as needed such that a different series of validity checks is performed having a different order of operations. Moreover, additional validity checks in addition to, or in replacement of, the validity checks shown in FIG. 8 may be used with exemplary embodiments of the present invention.

FIG. 9 is a flowchart outlining an exemplary operation of the present invention when the invoked user space operation is a completion queue retrieval process operation. The operation shown in FIG. 9 corresponds to step 630 in FIG. 6, for example.

As shown in FIG. 9, the operation starts by polling the completion queue to determine if there are any completion queue entries ready to be processed (step 910). A determination is made as to whether any completion queue entries are ready to be processed (step 920). If not, a null result is returned to the user space application (step 930). If there are completion queue entries ready to be processed, the next completion queue entry is returned to the user space application (step 940) and the operation terminates.

It should be noted that the above operations described in FIGS. 6-9 are applicable to file name based direct I/O operations in both non-virtual and virtual systems. In a virtual system, the only addition may be the invocation of the hypervisor, or other virtualization mechanism, by the operating system or system image to aid in maintaining a continuous range of virtual LBAs during resource creation, modification, querying or deletion.

As discussed above, with regard to the operation outlined in FIG. 6, the mechanisms of the present invention involve determining whether an invoked user space operation is directed to the creation, querying, modification or deletion of resource allocations for file name based direct I/O between the application and the adapter. Based on these determinations, various operations for creating, modifying, querying or deleting resource allocations may be invoked by the operating system or system image. Each of these operations will now be described, with reference to FIGS. 10-13, and with regard to the file name protection table, file extension protection table, and linear block address table of the present invention. It should be appreciated that the operations shown in FIGS. 10-13 may be performed for virtual and non-virtual systems. Thus, for example, the operations may be performed to create, modify, query and delete or destroy file name, file extension, and LBA entries based on logical volumes, SCSI identifier, or SCSI logical unit numbers.

FIG. 10 is a flowchart outlining an exemplary operation of the present invention when creating a LBA entry in an LBA table in accordance with an exemplary embodiment of the present invention. The operation outlined in FIG. 10 corresponds, for example, to step 665 in FIG. 6.

As shown in FIG. 10, the operation starts by receiving a user space operation that is a request to create one or more file protection table entries, i.e. allocate a set of LBAs as being associated with a particular file and with which direct I/O access by the application instance and/or system image is made possible (step 1010). In response to receiving the creation user space operation, the operating system or system image uses the physical I/O adapter's memory management interface to request that the physical I/O adapter create one or more file protection table entries (step 1020). The memory management interface can be implemented several different ways. For example, the memory management interface may be a queue where resource management operations can be passed from the system image to the adapter.

A determination is then made as to whether the I/O adapter has sufficient resources to complete the request (step 1030). For example, the I/O adapter may examine the file protection table to determine if an entry is available and if not, whether another file protection table segment may be created. If either of these determinations is positive, i.e. the allocation may be accommodated by the file protection table, then the determination in step 1030 is that the I/O adapter has sufficient resources; otherwise the determination is that the I/O adapter does not have sufficient resources available for the allocation.

If there are sufficient resources available to allocate the requested file and corresponding LBA storage space to the application instance, then appropriate file name protection table, file extension protection table, and LBA entries are created (step 1040). The LBA entry identifies the physical storage device LBAs that map to the file requested by the application instance. The file extension protection table entry identifies the access controls, domain protection, file name, etc. for the LBAs allocated to the file. This information may be obtained, for example, from the application instance requesting the allocation of the file and the processing queue of the application instance, e.g., protection domain, used to submit the request for allocation of the file.

The physical I/O adapter then returns the results of the creation user space operation to the application instance (step 1050). The results may include, for example, the FN_Key and FE_Keys generated for the file name protection table and file extension protection table entries created for the file. In addition, the physical I/O adapter may also inform the application instance of the LBAs that may be used by the application instance to perform file name based direct I/O to the physical I/O adapter.

If there are not sufficient resources to allocate the requested file, then the physical I/O adapter does not create the file protection table entries (step 1060). The resulting error is then returned by the physical I/O adapter to the application instance as the results of the creation user space operation (step 1050). The operation then terminates.

FIG. 11 is a flowchart outlining an exemplary operation of the present invention when processing a user space operation that is a resource modify operation. The operation outlined in FIG. 11 may correspond, for example, to step 685 of FIG. 6.

As shown in FIG. 11, the operation starts by receiving, from an application instance, system image, or the like, a user space operation requesting modification of one or more file protection table entries (step 1110). The system image then uses the physical I/O adapter's memory management interface to request that the physical adapter modify one or more file protection table entries associated with the file name identified by the application instance or system image (step 1120). A determination is made as to whether the physical I/O adapter has sufficient resources to complete the modification request (step 1130).

The file name protection table entry has a fixed set of fields and thus, an insufficient resources scenario will not apply to a file name protection table entry after it has been created. The file extension protection table has entries added to it as additional file extensions are created, i.e. LBAs are allocated to a particular file, and thus, is limited by the size of the LBA table segment. The LBA table segment can have additional entries added to it and, as described previously, there are scenarios where the LBA table segment may run out of resources. If there are not sufficient resources available to the physical I/O adapter to complete the modification request, the physical I/O adapter returns an error message to the application instance indicating an inability to complete the modifications (step 1140).

If there are sufficient resources available, a determination is made as to whether there are any active I/O transactions on the file protection table entry that is being modified (step 1150). If there are active I/O transactions on the file protection table entry that is being modified, the physical I/O adapter initiates a timer and waits for a quiescent point to be reached (step 1160). The quiescent point is a point at which there are no I/O transactions active on the file protection table entry being modified. This check, and waiting for a quiescent point, are necessary so that modifications are not made to a file protection table entry that would result in corruption of the system due to the active I/O transactions operating under the previous file protection table entry attributes.

A determination is then made as to whether the quiescent point is reached before a timeout of the timer (step 1170). If not, an error message is returned to the application instance indicating an inability to complete the modifications (step 1140). If a quiescent point is reached before timeout of the timer, the physical I/O adapter modifies the attributes of the file protection table entry (step 1180) and returns the attributes of the modified resource to the application instance (step 1190). The operation then terminates.

FIG. 12 is a flowchart outlining an exemplary operation of the present invention when processing a query user space operation. The operation outlined in FIG. 12 may correspond, for example, to step 645 of FIG. 6.

As shown in FIG. 12, the operation starts by receiving, from an application instance, the system image, or the like, a user space operation that requests a query of the attributes of a file protection table entry (step 1210). In response to receiving this user space operation, the system image uses the adapter's memory management interface to request that the physical I/O adapter query one or more file protection table entries (step 1220). The physical I/O adapter then returns the attributes of the file protection table entry to the application instance (step 1230).

FIG. 13 is a flowchart outlining an exemplary operation of the present invention when processing a destroy or delete user space operation. The operation shown in FIG. 13 corresponds, for example, to step 680 of FIG. 6. A file protection table entry may be destroyed or deleted, for example, if the operating system or system image allows a logical volume to be reduced by the middleware or application instance. This reduction may then cause LBA table entries, file extension protection table, and even file name protection table entries to be destroyed or deleted, for example.

As shown in FIG. 13, the operation starts by receiving a destroy or delete user space operation (step 1310). In response to receiving the destroy or delete user space operation, the system image uses the physical I/O adapter's memory management interface to request that the physical I/O adapter destroy or delete one or more file protection table entries (step 1320). A determination is made as to whether an I/O transaction is active on the file protection table entry that is being deleted or destroyed (step 1330).

If an I/O transaction is active on the file protection table entry, the physical I/O adapter initiates a timer and waits for a quiescent point to be reached (step 1340). A determination is then made as to whether the quiescent point is reached before the timer times out (step 1350). If not, the physical I/O adapter creates an error result and returns the error result to the application instance (step 1360). If the quiescent point is reached before the timer times out, or if there is no active I/O transaction on the file protection table entry, the physical I/O adapter destroys or deletes the existing file protection table entry (step 1370) and returns the result to the application instance (step 1380). When a file protection table entry is destroyed or deleted by the operating system or system image, an entry is removed from the file protection table segment and the LBAs in the disk are freed and made available for use of other applications.

It should be noted that the operations outlined in the flowcharts described above make reference to the operations performed on one or more file protection table entries. When such operations are performed, changes to other file protection table entries may also be required. For example, during the creation and modification operations, the middleware or application instance may increase the number of LBAs associated with a particular file by creating additional entries in the LBA table. This in turn requires additional entries in the file extension protection table to point to the new LBA table entries. Similarly, during the delete or destroy operation, the operating system or system image destroys one or more LBA table entries or segment(s) and then sets the access control fields of associated file extension protection table entries to invalid.

Thus, with the present invention, an invoked user space operation is checked to see if the operation is a resource query, resource create, resource destroy, resource modify, work queue, or completion queue operation. Based on this determination, corresponding operations for querying, creating, destroying, and modifying resource allocations, work queue entries, and completion queue entries are performed. Thus, if an application requires resources in order to perform file name based direct I/O operations, needs to modify an allocation of resources in order to perform such direct I/O operations, or needs to destroy resource allocations, the present invention provides mechanisms to achieve these purposes. In addition, the application may submit work queue entries for processing, and process completion queue entries to obtain information regarding work queue entries whose processing by the physical I/O adapter has been completed. In this way, file name based direct I/O operations are managed by the mechanisms of the present invention.

Moreover, as illustrated in the exemplary embodiments described above, the present invention provides a plurality of data structures and mechanisms for handling file name based I/O operations. These data structures and mechanisms provide for processing queue to linear block address translation using file protection table access controls. This mechanism ensures that only an application associated with the file, and thus, the corresponding portions of the storage device, may actually access the portion of the storage device. A plurality of validation checks, including a key checks and a protection domain check, are used to maintain this level of security. These checks ensure that the application instance is accessing a valid adapter protection table entry and that the application has permission to access portions of the storage device associated with a valid file extension protection table entry.

It should be noted that, while the above mechanisms of the exemplary embodiments of the present invention make use of the operating system or system image to perform a number of operations with regard to the creation and management of the file protection table entries, these operations are not generally performed with each work request processed by the adapter. That is, the operating system or system image is only involved in the setup of the file protection table entries and the registration of the application instances/middleware with the associated files/LBAs. The operating system or system image is not required in order to process each actual work request submitted by the middleware or application instance since the application and adapter can use the file protection table and mechanisms described above to process the work requests. As a result, the present invention eliminates the context switches, and their associated overhead, required by prior art mechanisms, as explained in the background of the invention above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, comprising:
   receiving a user space operation from a user management interface;
   determining if the user space operation is a resource management operation or a processing queue operation;
   performing at least one resource management operation to manage a resource allocation for a resource in a file protection table data structure having a file name protection table, a file extension protection table, and a storage block address table, if the user space operation is the resource management operation, wherein the storage block address table identifies portions of a storage device which is to be allocated to a set of files for which the resource allocation is requested, wherein the file extension protection table comprises a set of pointers to one or more entries in the storage block address table and a set of file extension keys, and wherein the file name protection table comprises a set of pointers to one or more segments of the file extension protection table and a set of file name keys, wherein performing the at least one resource management operation further comprises:
      determining if the user space operation is a resource modify operation;
      responsive to the user space operation being the resource modify operation, modifying at least one attribute associated with a resource allocation in a file protection table entry, wherein modifying the at least one attribute associated with the resource allocation in the file protection table entry comprises modifying an attribute in a storage block address table entry;
      initiating a timer if there is an I/O transaction active on the file protection table entry;
      determining if a quiescent point at which there are no I/O transactions active on the file protection table entry being modified is reached before the timer times out; and
      modifying the file protection table entry only if the quiescent point is reached before the timer times out; and
   performing at least one processing queue operation, directly with an input/output (I/O) adapter without intervention by a system image, to manage a processing queue, if the user space operation is the processing queue operation, wherein performing the at least one processing queue operation comprises: retrieving a completion queue entry from a completion queue in an I/O adapter for a completed out of user space input/output operation.

2. The method of claim 1, wherein performing the at least one resource management operation further comprises:
   determining if the user space operation is a resource query operation and responsive to the user space operation being the resource query operation:
      identifying a file name protection table entry corresponding to the resource;
      identifying a file extension protection table entry corresponding to the file name protection table entry;
      retrieving attribute information of the resource from the file extension protection table entry, wherein retrieving the attribute information for the resource allocation comprises: querying the file extension protection table entry using a memory management interface of the I/O adapter; and
      returning the retrieved attribute information of the resource to the user management interface.

3. The method of claim 1, wherein performing the at least one resource management operation further comprises:
   determining if the user space operation is a resource create operation and responsive to the user space operation being the resource create operation:
      creating the resource allocation in a file protection table entry of the file protection table data structure; and
      returning results of the creation of the resource allocation to the user management interface.

4. The method of claim 3, wherein creating the resource allocation in the file protection table entry comprises:
   identifying a file name protection table entry corresponding to the resource;
   identifying a file extension protection table entry corresponding to the file name protection table entry;
   identifying a segment of the storage block address table corresponding to the file extension protection table entry;
   adding at least one entry to the segment of the storage block address table; and
   updating the file extension protection table to reference the added at least one entry in the segment of the storage block address table.

5. The method of claim 3, wherein performing the at least one resource management operation comprises:
   determining if the I/O adapter has available resources for allocating based on the user space operation, wherein the resources are allocated by creating the resource allocation only if the I/O adapter has available resources to be allocated.

6. The method of claim 3, wherein creating the resource allocation in the file protection table entry of the file protection table data structure comprises:
   creating at least one entry in the storage block address table identifying at least one portion of the storage device which is to be allocated to a file for which the resource allocation is requested;
   creating an entry in the file extension protection table for the at least one entry in the storage block address table, wherein the entry in the file extension protection table has a pointer to the at least one entry in the storage block address table and has an associated file extension key;
   creating an entry in the file name protection table corresponding to a file for which the resources are to be allocated, wherein the file name protection table entry has a pointer to a segment of the file extension protection table and has an associated file name key; and
   returning the file extension key and file name key to the application instance for use in submitting I/O requests.

7. The method of claim 3, wherein creating the resource allocation in the file protection table entry comprises:
   using a memory management interface of the I/O adapter to create the file protection table entry.

8. The method of claim 1, wherein performing the at least one processing queue operation comprises;

building and adding at least one work queue entry to a work queue associated with an application instance running on the data processing system; and informing the I/O adapter that the at least one work queue entry has been added to the work queue.

9. The method of claim 8, further comprising:

performing, in the I/O adapter, at least one validation check to ensure that the application instance may access portions of a storage device associated with a file referenced in the at least one work queue entry; and performing, in the I/O adapter, at least one containment check to ensure that the portions of the storage device associated with a file referenced by the at least one work queue entry are within the portions of the storage device that have been allocated to the application instance.

10. A computer program product comprising a computer readable medium having a computer readable program stored therein, wherein the computer readable program, when executed on a computing device, causes the computing device to:

receive a user space operation from a user management interface;

determine if the user space operation is a resource management operation or a processing queue operation;

perform at least one resource management operation to manage a resource allocation for a resource in a file protection table data structure having a file name protection table, a file extension protection table and a storage block address table, if the user space operation is a resource management operation, wherein the storage block address table identifies portions of a storage device which is to be allocated to a set of files for which the resource allocation is requested, wherein the file extension protection table comprises a set of pointers to one or more entries in the storage block address table and a set of file extension keys, and wherein the file name protection table comprises a set of pointers to one or more segments of the file extension protection table and a set of file name keys wherein performing the at least one resource management operation further comprises:

determining if the user space operation is a resource modify operation;

responsive to the user space operation being the resource modify operation, modifying at least one attribute associated with a resource allocation in a file protection table entry, wherein modifying the at least one attribute associated with the resource allocation in the file protection table entry comprises modifying an attribute in a storage block address table entry;

initiating a timer if there is an I/O transaction active on the file protection table entry;

determining if a quiescent point at which there are no I/O transactions active on the file protection table entry being modified is reached before the timer times out; and modifying the file protection table entry only if the quiescent point is reached before the timer times out; and perform at least one processing queue operation, directly with an input/output (I/O) adapter without intervention by a system image, to manage a processing queue, if the user space operation is a processing queue operation, wherein the computer readable program causes the computing device to perform at least one processing queue operation by retrieving a completion queue entry from a completion queue in an I/O adapter for a completed out of user space input/output operation.

11. The computer program product of claim 10, wherein the computer readable program causes the computing device to perform at least one resource management operation by determining if the user space operation is a resource query operation, and if the user space operation is a resource query operation:

identifying a file name protection table entry corresponding to the resource;

identifying a file extension protection table entry corresponding to the file name protection table entry;

retrieving attribute information of a resource from the file extension protection table entry, wherein the computer readable program causes the computing device to retrieve attribute information for the resource allocation by using a memory management interface of the I/O adapter to query the file extension protection table entry; and returning the retrieved attribute information of the resource to the user management interface.

12. The computer program product of claim 10, wherein the computer readable program causes the computing device to perform at least one resource management operation by determining if the user space operation is a resource create operation, and if the user space operation is a resource create operation:

creating the resource allocation in a file protection table entry of the file protection table data structure, wherein the computer readable program causes the computing device to create the resource allocation in the file protection table entry by:

identifying a file name protection table entry corresponding to the resource;

identifying a file extension protection table entry corresponding to the file name protection table entry;

identifying a segment of the storage block address table corresponding to the file extension protection table entry;

adding at least one entry to the segment of the storage block address table; and updating the file extension protection table to reference the added at least one entry in the segment of the storage block address table; and, wherein the computer readable program causes the computing device to create the resource allocation in the file protection table entry of the file protection table data structure by:

creating at least one entry in the storage block address table identifying at least one portion of the storage device which is to be allocated to a file for which the resource allocation is requested;

creating an entry in the file extension protection table for the at least one entry in the storage block address table, wherein the entry in the file extension protection table has a pointer to the at least one entry in the storage block address table and has an associated file extension key;

creating an entry in the file name protection table corresponding to a file for which the resources are to be allocated, wherein the file name protection table entry has a pointer to a segment of the file extension protection table and has an associated file name key; and returning the file extension key and file name key to the application instance for use in submitting I/O requests; and returning results of the creation of the resource allocation to the user management interface, wherein the computer readable program causes the computing device to perform at least one resource management operation by determining if the I/O adapter has available resources for allocating based on the user space operation, wherein the resources are allocated by creating the resource allocation only if the I/O adapter has available resources to be allocated and wherein the computer readable program causes the computing device to create the resource allocation in the file protection table entry by using a memory management interface of the I/O adapter to create the file protection table entry.

13. The computer program product of claim 10, wherein the computer readable program causes the computing device to perform at least one processing queue operation by:
   building and adding at least one work queue entry to a work queue associated with an application instance running on the data processing system;
   informing the I/O adapter that the at least one work queue entry has been added to the work queue;
   performing, in the I/O adapter, at least one validation check to ensure that the application instance may access portions of a storage device associated with a file referenced in the at least one work queue entry; and
   performing, in the I/O adapter, at least one containment check to ensure that the portions of the storage device associated with a file referenced by the at least one work queue entry are within the portions of the storage device that have been allocated to the application instance.

14. An apparatus, comprising:
   a processor; and
   a storage device coupled to the processor, wherein the processor:
   receives a user space operation from a user management interface;
   determines if the user space operation is a resource management operation or a processing queue operation;
   performs at least one resource management operation to manage a resource allocation for a resource in a file protection table data structure, stored in the storage device, having a file name protection table, a file extension protection table and a storage block address table, if the user space operation is a resource management operation, wherein the storage block address table identifies portions of a storage device which is to be allocated to a set of files for which the resource allocation is requested, wherein the file extension protection table comprises a set of pointers to one or more entries in the storage block address table and a set of file extension keys, and wherein the file name protection table comprises a set of pointers to one or more segments of the file extension protection table and a set of file name keys, wherein performing the at least one resource management operation further comprises:
      determining if the user space operation is a resource modify operation;
      responsive to the user space operation being the resource modify operation, modifying at least one attribute associated with a resource allocation in a file protection table entry, wherein modifying the at least one attribute associated with the resource allocation in the file protection table entry comprises modifying an attribute in a storage block address table entry;
      initiating a timer if there is an I/O transaction active on the file protection table entry;
      determining if a quiescent point at which there are no I/O transactions active on the file protection table entry being modified is reached before the timer times out; and
      modifying the file protection table entry only if the quiescent point is reached before the timer times out; and
   performs at least one processing queue operation, directly with an input/output (I/O) adapter without intervention by a system image, to manage a processing queue, if the user space operation is a processing queue operation, wherein the processor performs at least one processing queue operation by retrieving a completion queue entry from a completion queue in an I/O adapter for a completed out of user space input/output operation.

15. The apparatus of claim 14, wherein the processor performs at least one resource management operation by determining if the user space operation is a resource query operation, and if the user space operation is a resource query operation:
   identifying a file name protection table entry corresponding to the resource;
   identifying a file extension protection table entry corresponding to the file name protection table entry;
   retrieving attribute information of a resource from the file extension protection table entry, wherein the computer readable program causes the computing device to retrieve attribute information for the resource allocation by using a memory management interface of the I/O adapter to query the file extension protection table entry; and
   returning the retrieved attribute information of the resource to the user management interface.

16. The apparatus of claim 14, wherein the processor performs at least one resource management operation by determining if the user space operation is a resource create operation, and if the user space operation is a resource create operation:
   creating the resource allocation in a file protection table entry of the file protection table data structure, wherein the computer readable program causes the computing device to create the resource allocation in the file protection table entry by:
      identifying a file name protection table entry corresponding to the resource;
      identifying a file extension protection table entry corresponding to the file name protection table entry;
      identifying a segment of the storage block address table corresponding to the file extension protection table entry;
      adding at least one entry to the segment of the storage block address table; and
      updating the file extension protection table to reference the added at least one entry in the segment of the storage block address table; and, wherein the computer readable program causes the computing device to create the resource allocation in the file protection table entry of the file protection table data structure by:
   creating at least one entry in the storage block address table identifying at least one portion of the storage device which is to be allocated to a file for which the resource allocation is requested;
   creating an entry in the file extension protection table for the at least one entry in the storage block address table, wherein the entry in the file extension protection table has a pointer to the at least one entry in the storage block address table and has an associated file extension key;
   creating an entry in the file name protection table corresponding to a file for which the resources are to be allocated, wherein the file name protection table entry has a pointer to a segment of the file extension protection table and has an associated file name key; and returning the file extension key and file name key to the application instance for use in submitting I/o requests; and returning results of the creation of the resource allocation to the user management interface, wherein the computer readable program causes the computing device to perform at least one resource management operation by determining if the I/O adapter has available resources for allocating based on the user space operation, wherein the resources are allocated by creating the resource allocation only if the I/O adapter has available resources to be allocated and wherein the computer readable program causes the computing device to create the resource allocation in the file protection table entry by using a memory management interface of the I/O adapter to create the file protection table entry.

17. The apparatus of claim 14, wherein the processor performs at least one processing queue operation by:

building and adding at least one work queue entry to a work queue associated with an application instance running on the data processing system;

informing the I/O adapter that the at least one work queue entry has been added to the work queue;

performing, in the I/O adapter, at least one validation check to ensure that the application instance may access portions of a storage device associated with a file referenced in the at least one work queue entry; and performing, in the I/O adapter, at least one containment check to ensure that the portions of the storage device associated with a file referenced by the at least one work queue entry are within the portions of the storage device that have been allocated to the application instance.

* * * * *

UNITED STATES PATENT AND TRADEMARK OFFICE
CERTIFICATE OF CORRECTION

PATENT NO.        : 7,657,662 B2
APPLICATION NO. : 11/216712
DATED             : February 2, 2010
INVENTOR(S)       : Boyd et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Thirtieth Day of November, 2010

David J. Kappos
*Director of the United States Patent and Trademark Office*